United States Patent
Takyoh

(10) Patent No.: US 11,378,920 B2
(45) Date of Patent: Jul. 5, 2022

(54) STEP MOTOR DRIVING DEVICE

(71) Applicant: CITIZEN WATCH CO., LTD., Tokyo (JP)

(72) Inventor: Yu Takyoh, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 17/254,822

(22) PCT Filed: Jun. 21, 2019

(86) PCT No.: PCT/JP2019/024760
§ 371 (c)(1),
(2) Date: Dec. 21, 2020

(87) PCT Pub. No.: WO2020/008918
PCT Pub. Date: Jan. 9, 2020

(65) Prior Publication Data
US 2021/0263474 A1 Aug. 26, 2021

(30) Foreign Application Priority Data
Jul. 2, 2018 (JP) .............................. JP2018-126055

(51) Int. Cl.
G04C 3/14 (2006.01)
H02P 6/182 (2016.01)
H02P 8/02 (2006.01)

(52) U.S. Cl.
CPC .............. *G04C 3/143* (2013.01); *H02P 6/182* (2013.01); *H02P 8/02* (2013.01)

(58) Field of Classification Search
CPC ...... H02P 8/00; H02P 8/02; H02P 8/04; H02P 8/22; H02P 8/24; H02P 8/30; H02P 8/34;
(Continued)

(56) References Cited

U.S. PATENT DOCUMENTS 4,136,308 A * 1/1979 King .................... H02P 8/14
318/696
2017/0261939 A1 9/2017 Hosobuchi

FOREIGN PATENT DOCUMENTS

EP 0553354 B1 * 2/1997 ............... H02P 6/18
EP 2487549 A1 8/2012
(Continued)

OTHER PUBLICATIONS

International Search Report for PCT/JP2019/024760 with English translation.
(Continued)

*Primary Examiner* — Antony M Paul
(74) *Attorney, Agent, or Firm* — HEA Law PLLC

(57) ABSTRACT

To reliably rotate a step motor while reducing power consumption, a step motor driving device includes a step motor that includes a rotor, stator, coil, driver circuit that outputs a measurement drive signal to the coil, phase detecting circuit that detects a counter-electromotive current that is generated in the coil after the output of the measurement drive signal and determines whether a phase of the rotor is a desired phase based on the detected counter-electromotive current, and a control unit that, if the phase is the desired phase, controls the step motor by a first driving method in which the drive circuit outputs a first drive signal for rotating the rotor by one step, and, if not, controls the step motor by a second driving method different from the first driving method so as to restrict the rotation of the rotor.

12 Claims, 20 Drawing Sheets

(58) Field of Classification Search
CPC .... H02P 1/00; H02P 1/163; H02P 1/18; H02P 1/22; H02P 1/24; H02P 1/42; H02P 1/46; H02P 1/465; H02P 3/00; H02P 3/06; H02P 3/20; H02P 3/24; H02P 6/00; H02P 6/12; H02P 6/14; H02P 6/153; H02P 6/157; H02P 6/16; H02P 6/182; H02P 6/24; H02P 7/00; H02P 7/293; H02P 2203/07; H02P 23/00; H02P 27/00
See application file for complete search history.

(56) References Cited

FOREIGN PATENT DOCUMENTS

| | | |
|---|---|---|
| EP | 2538285 A1 | 12/2012 |
| EP | 3203329 A1 | 8/2017 |
| JP | S6373181 A | 4/1988 |
| JP | 2009213221 A | 9/2009 |
| JP | 2016003877 A | 1/2016 |
| JP | 2016170019 A | 9/2016 |

OTHER PUBLICATIONS

Extended European Search Report dated Feb. 24, 2022, for corresponding EP Patent Application No. 19830398.4.

* cited by examiner

FIG.7
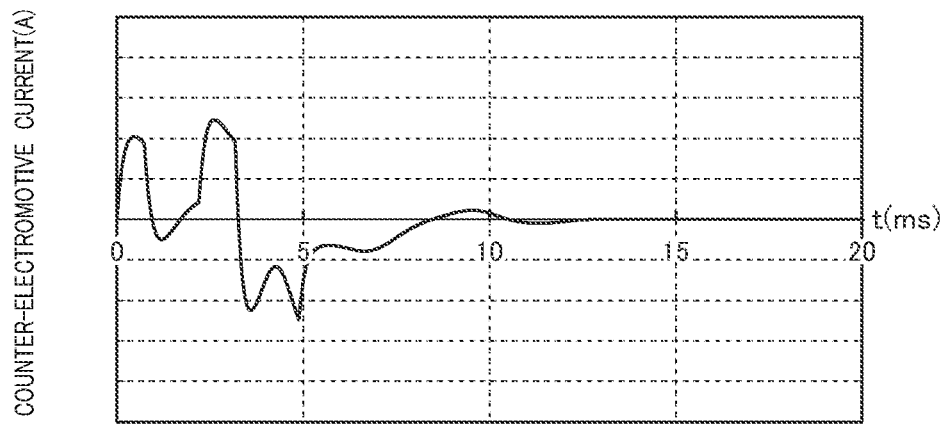
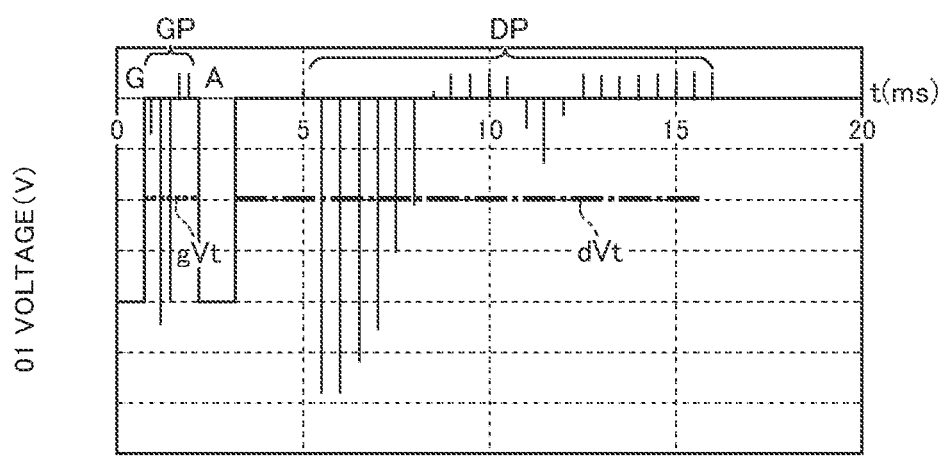
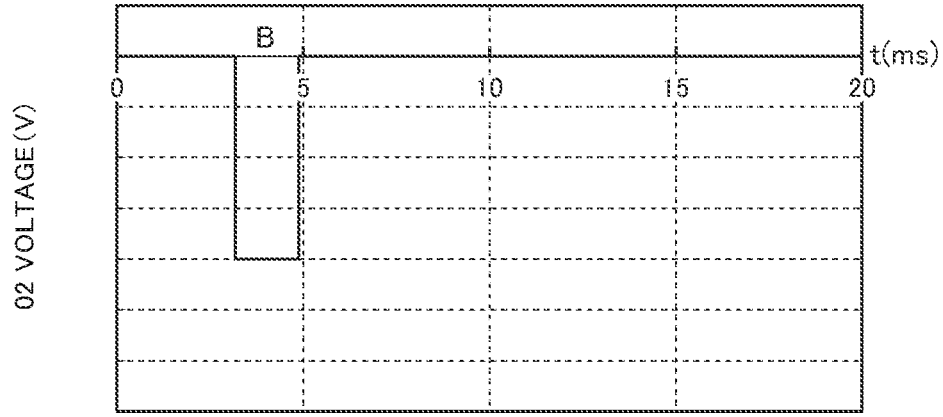

FIG.8
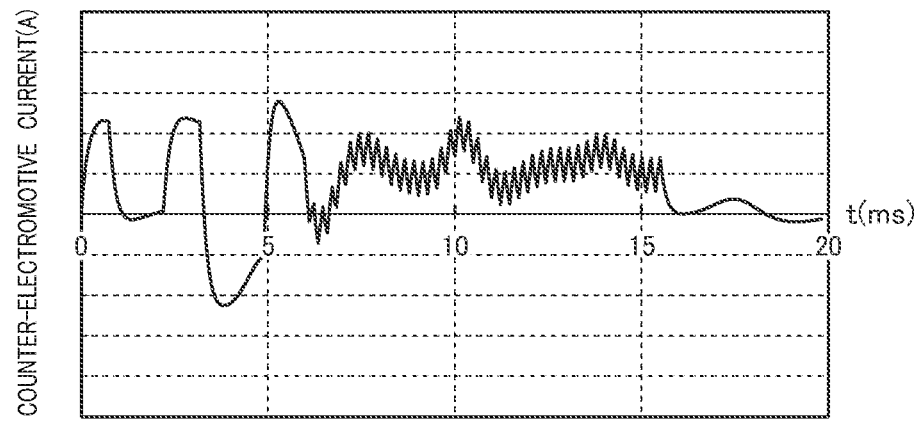
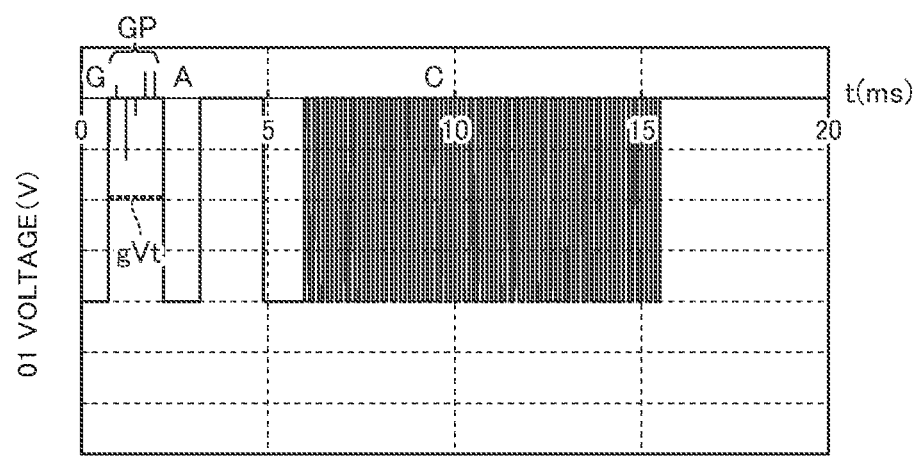
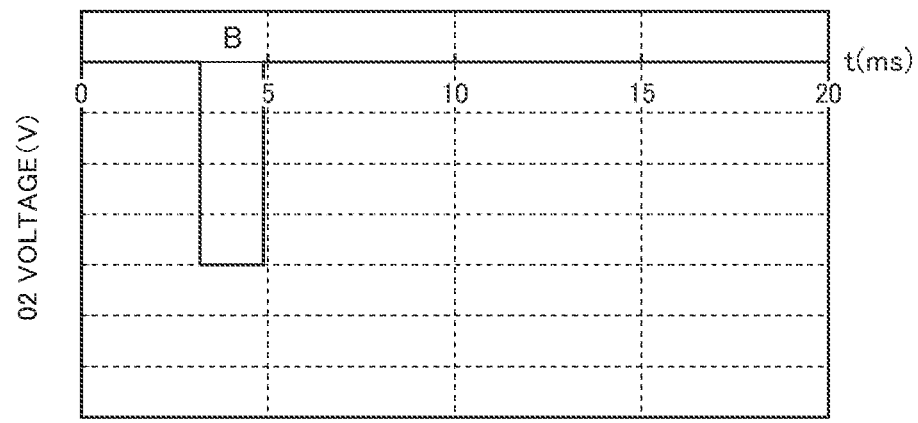

FIG.9
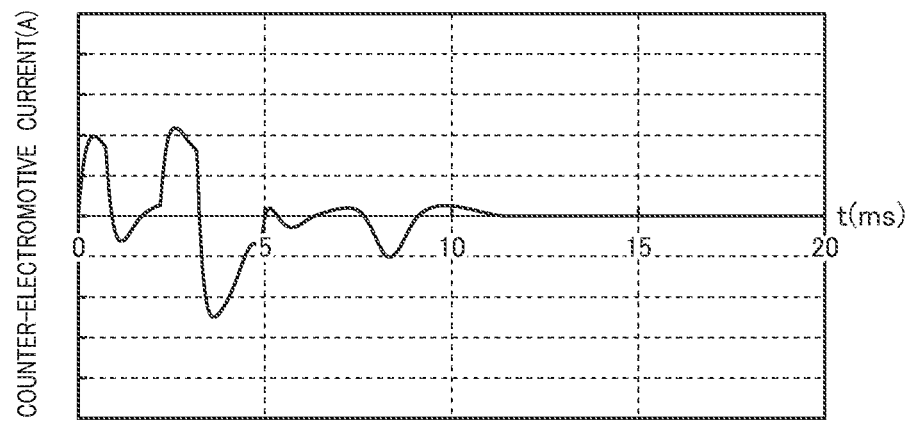
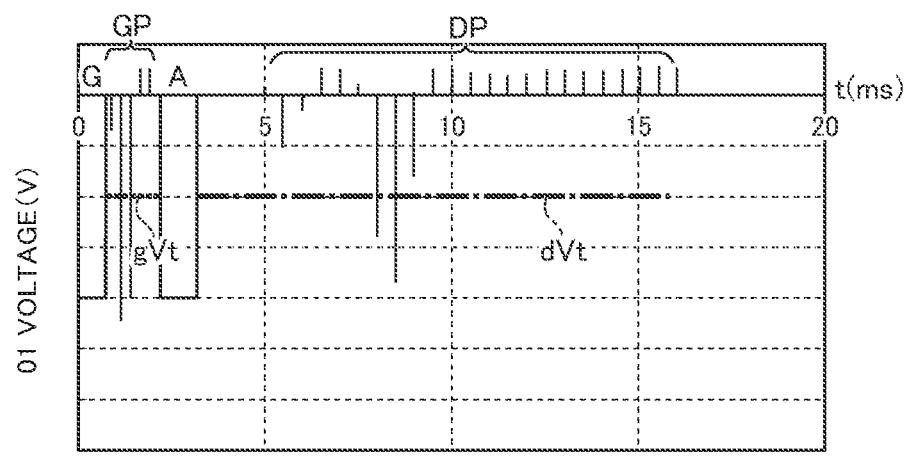
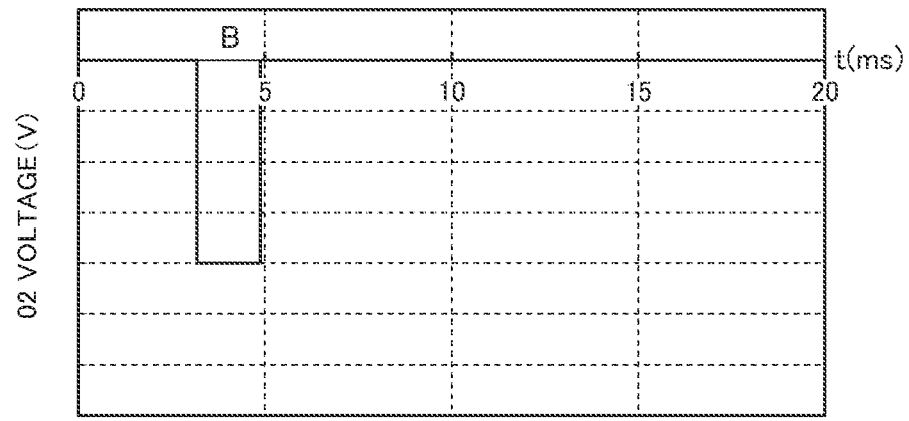

FIG.10
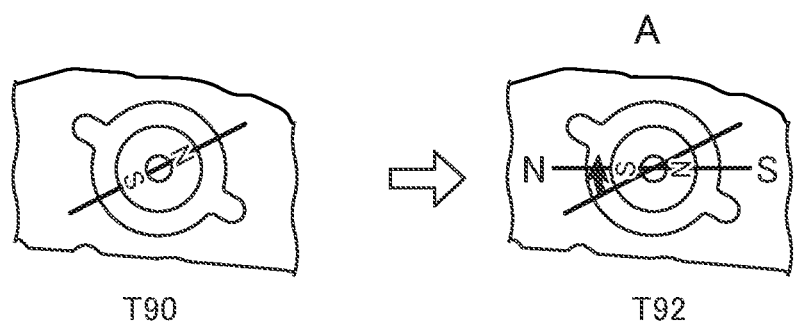
T90   T92
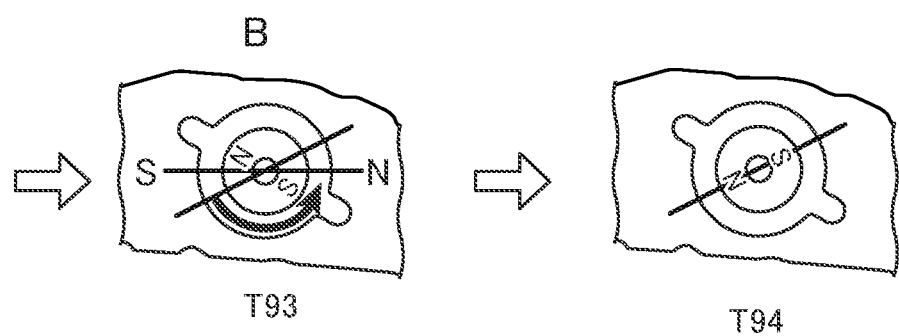
T93   T94

FIG.11
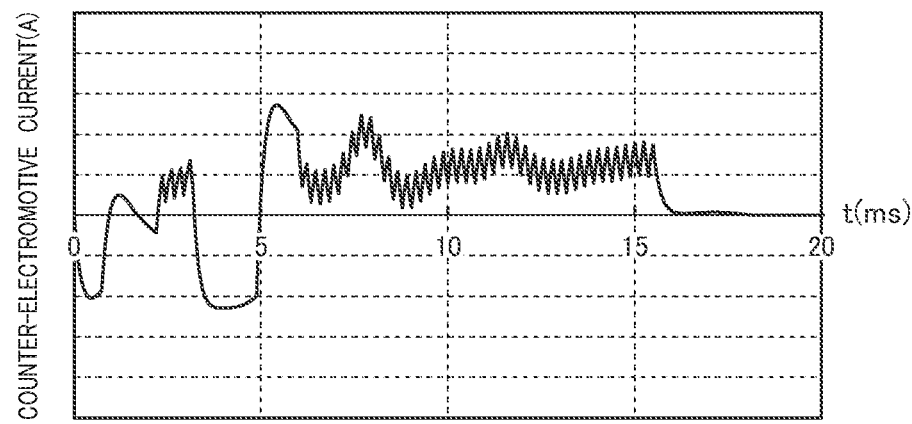
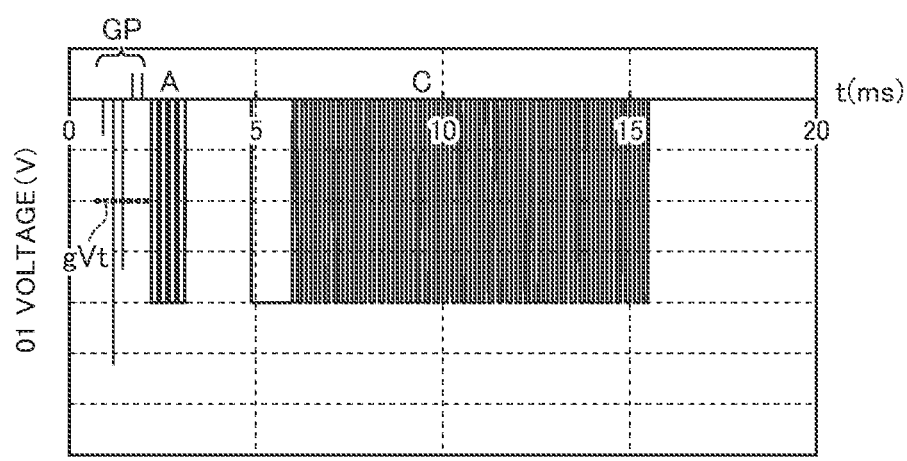
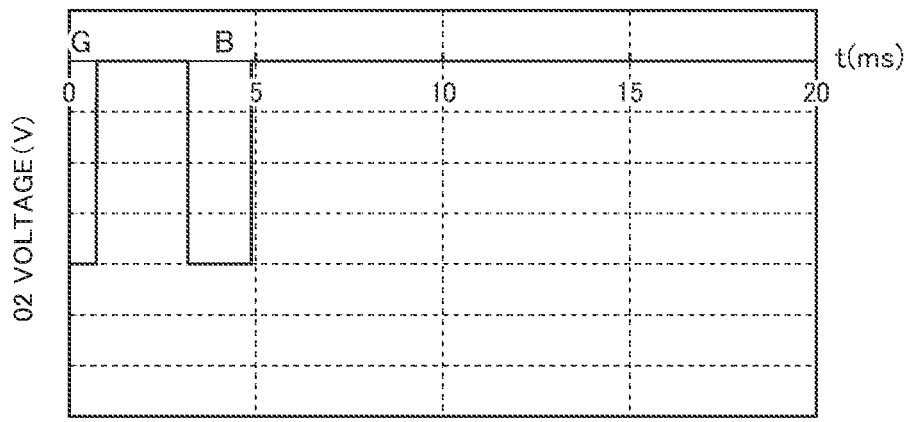

FIG.12
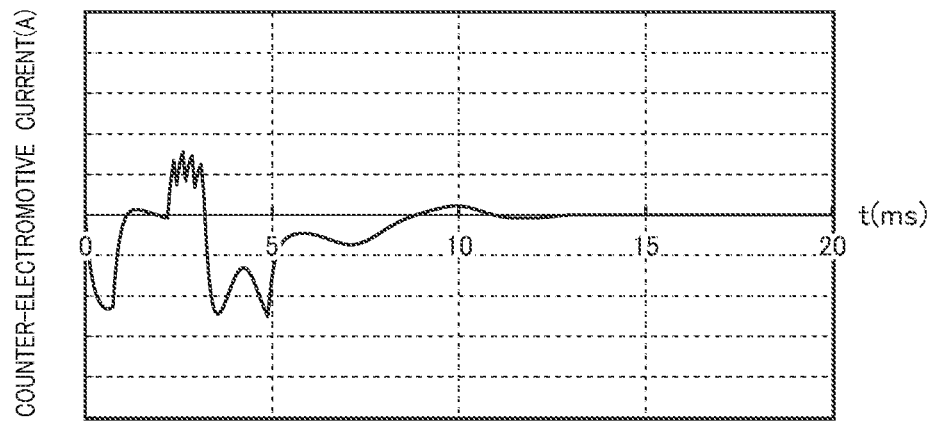
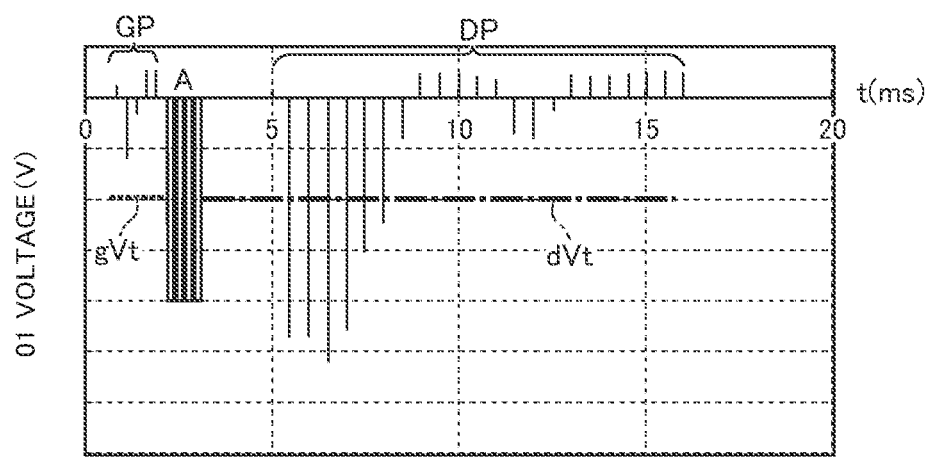
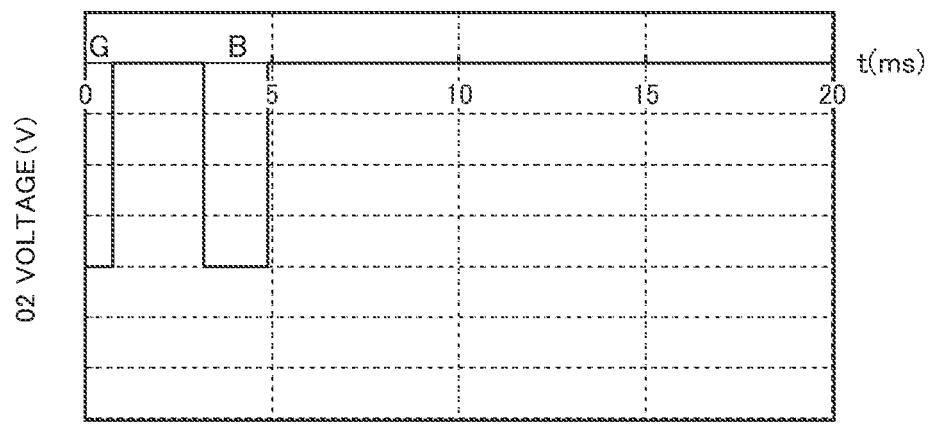

FIG.13
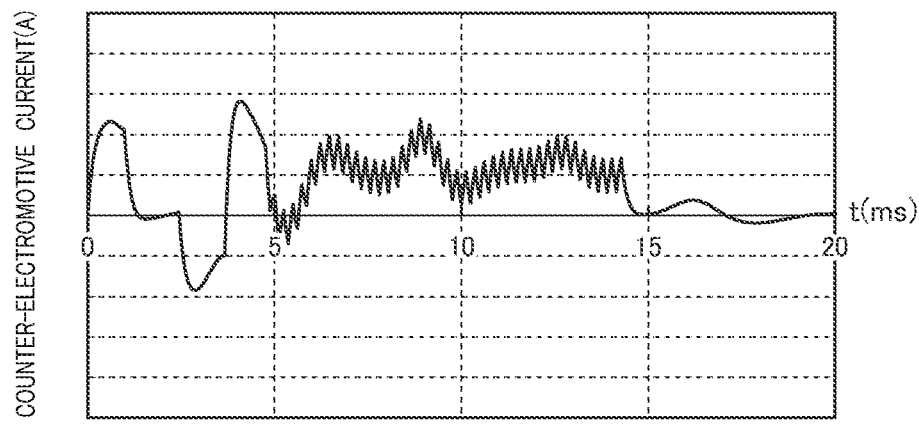
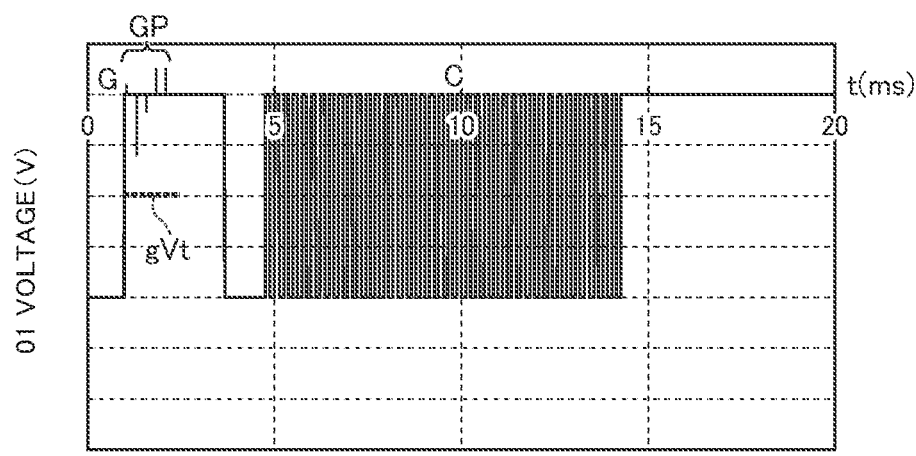
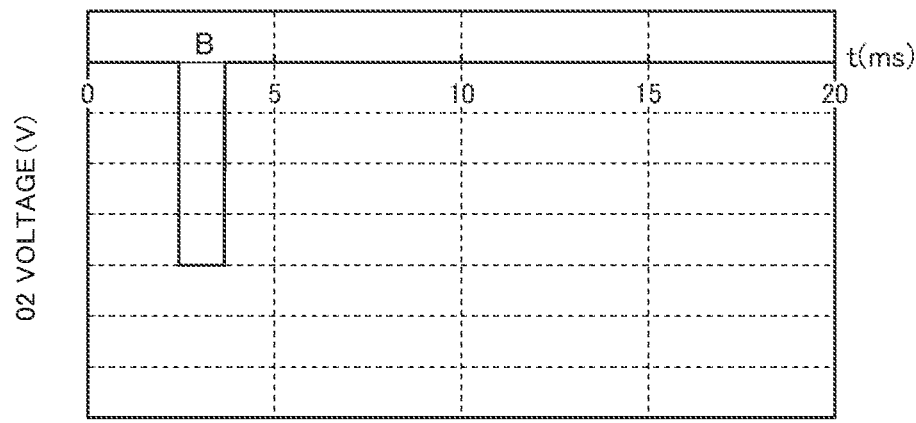

FIG.14
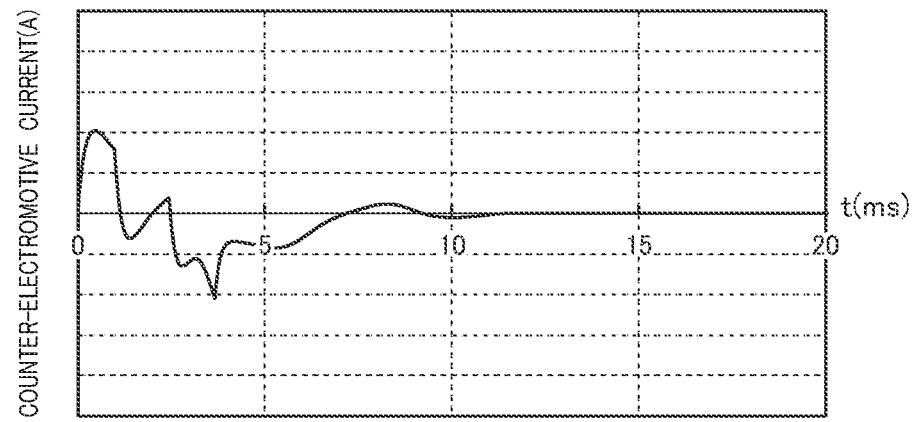
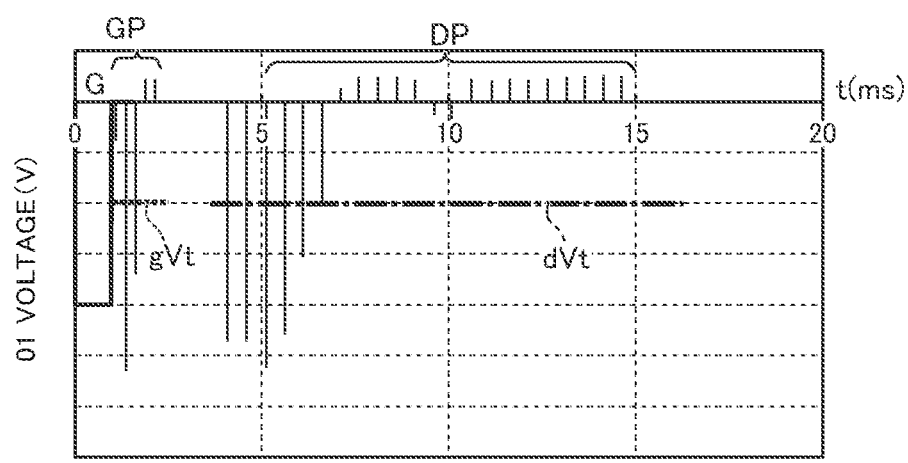
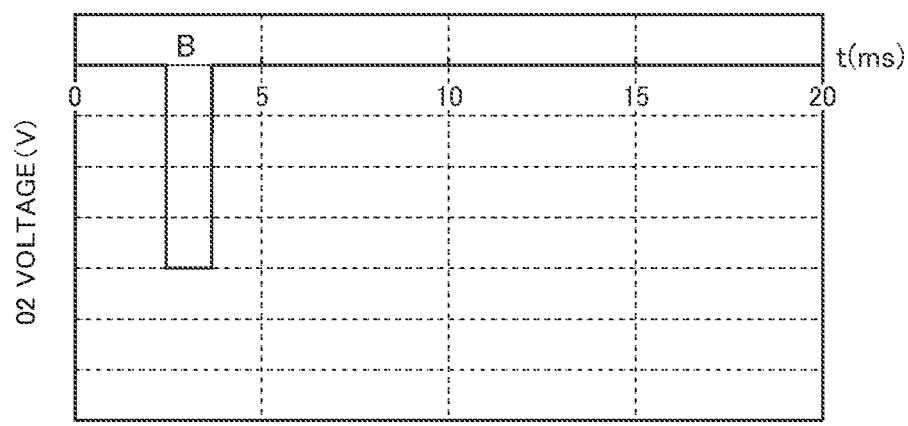

FIG.17
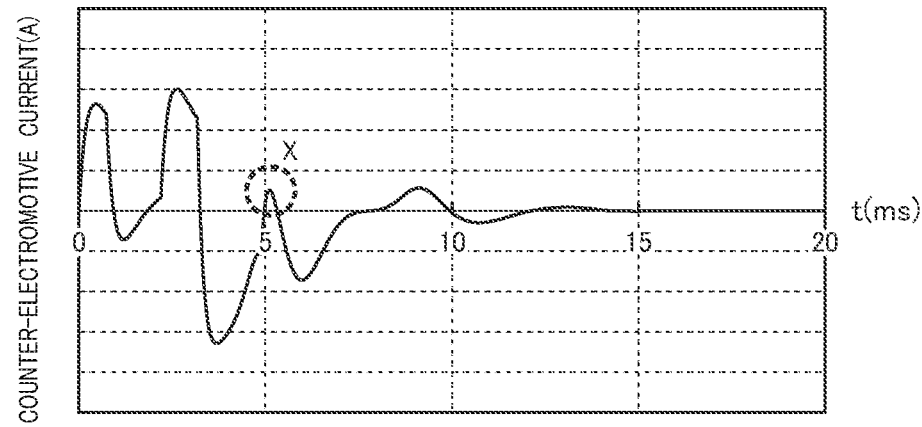
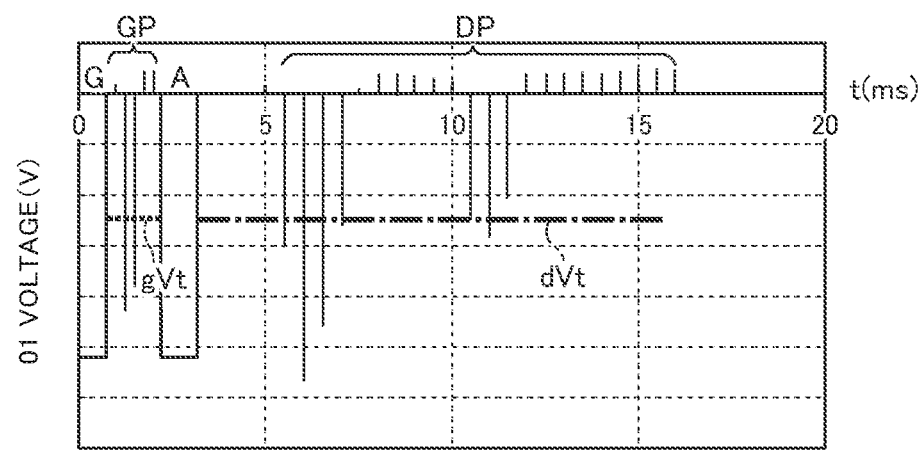
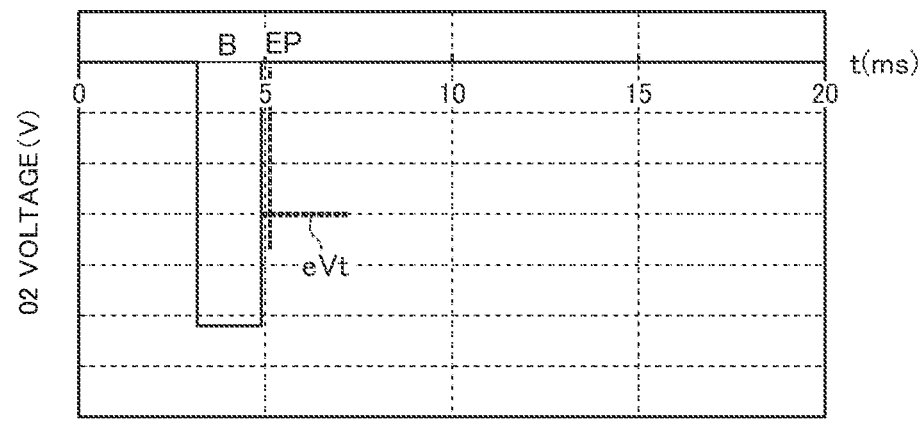

FIG.18
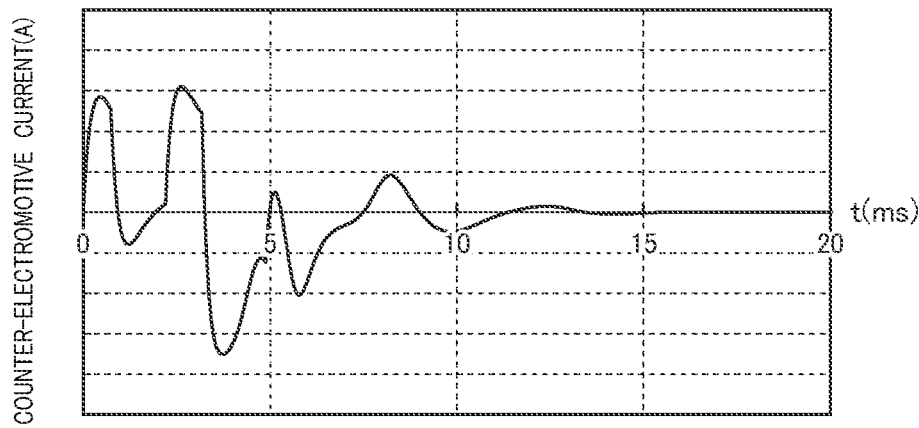
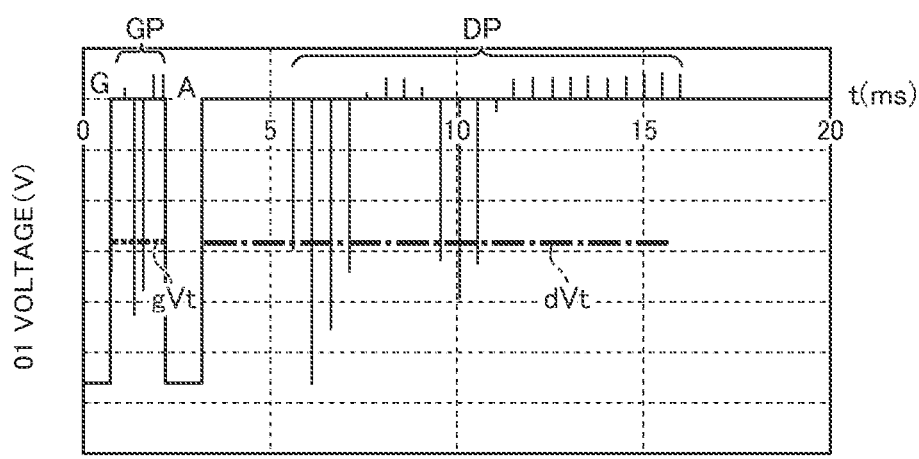
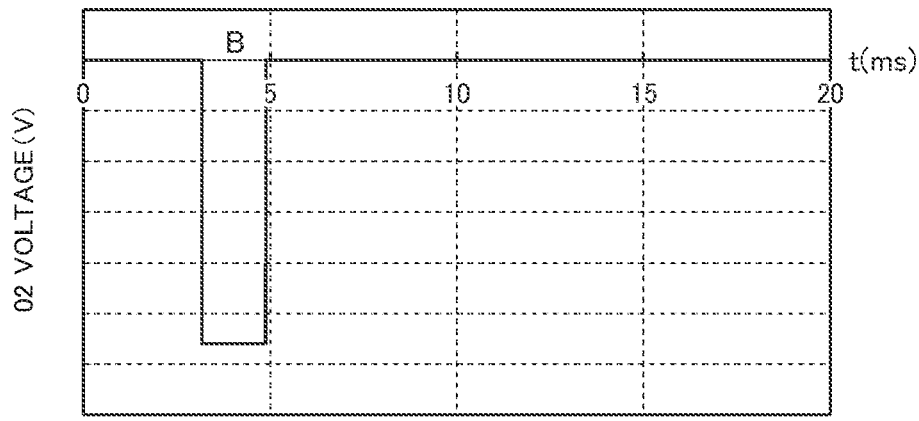

US 11,378,920 B2

STEP MOTOR DRIVING DEVICE

CROSS REFERENCE TO RELATED APPLICATIONS

This application is a National Stage of International Application No. PCT/JP2019/024760 filed on Jun. 21, 2019, which claims priority to Japanese Patent Application No. 2018-126055 filed on Jul. 2, 2018. The contents of each of the above documents are incorporated herein by reference in their entirety.

TECHNICAL FIELD

The present invention relates to a step motor driving device.

BACKGROUND ART

In an electronic watch with an analogue display means, for example, a step motor drives its hands. In a step motor having one coil and a rotor that is half-rotated in one step, a position where a magnetic pole of the rotor is stable when the coil is not energized and a position where the magnetic pole is stable when the coil is energized are different. This is to reliably make the coil rotate forward by applying only one pulse to the coil. In reversing the rotor, a first pulse to slightly rotate the rotor in the forward direction is applied to the coil, and then a second pulse of the potential in the opposite direction is applied to the coil so as to utilize the reaction to rotate the rotor in the reverse direction. Further, a third pulse having the same polarity as the first pulse is applied to the coil so that the rotor is more reliably stabilized at a desired position.

Patent Literature 1 discloses applying the repulsion pulse G1, the attraction pulse G2, and the repulsion pulse G3 to the coil in this order when reversing the step motor. The repulsion pulse G1 rotates the rotor in the forward direction, the attraction pulse G2 rotates the rotor in the reverse direction and pulls it back, and the repulsion pulse G3 pushes back the rotation of the rotor rotating in the reverse direction. Patent Literature 2 discloses, for rotating the step motor forward, swinging the rotor by applying the swing pulse after the drive pulse is applied, detecting whether the rotor is rotated based on the voltage generated by the swing of the rotor, and applying the correction drive pulse when the rotor is not rotated.

CITATION LIST

Patent Literature

Patent Literature 1: JP2016-3877A
Patent Literature 2: JPS63-73181A

SUMMARY OF INVENTION

Technical Problem

The inventors are considering not outputting the third pulse as much as possible in order to reduce the power consumption when reversing the step motor. On the other hand, external factors such as impact may cause the position of the rotor to deviate from the original position by half a rotation. If only the first pulse and the second pulse are output in such a case, the rotor rotates forward, and will also rotate forward in subsequent steps. The correction is very difficult in such a case, and thus the output of the third pulse could not be reduced.

One or more embodiments of the present invention have been conceived in view of the above, and an object thereof is to provide a step motor driving device capable of reliably reverse a step motor while reducing power consumption.

Solution to Problem

In order to solve the above described problems, the step motor drive device according to the present invention employs the configurations described below.

(1) A step motor driving device includes a step motor that includes a rotor that is magnetized by two or more poles, a stator that transmits a magnetic force to the rotor and a coil that generates a magnetic force toward the stator, a drive circuit that outputs a measurement drive signal to the coil, a phase detecting circuit that detects a counter-electromotive current that occurs in the coil after the output of the measurement drive signal, and determines whether a phase of the rotor is a desired phase based on the detected counter-electromotive current, and a control unit that controls the step motor by a first driving method, in which the drive circuit outputs a first drive signal for rotating the rotor by one step, when the phase is the desired phase, and controls the step motor by a second driving method different from the first driving method so as to limit the rotation of the rotor when the phase is not the desired phase.

(2) In (1), when the phase is the desired phase, the control unit controls the step motor by the first driving method in which the drive circuit outputs the first drive signal for rotating the rotor one step backward.

(3) In (1) or (2), in the first driving method, the drive circuit outputs the first drive signal including a first partial signal and a second partial signal, the first partial signal generating a magnetic force of a first polarity in the coil, the second partial signal generating a magnetic force of a second polarity opposite to the first polarity in the coil after the first partial signal.

(4) In any one of (1) to (3), in the second driving method, the drive circuit outputs a second drive signal including a first partial signal, a second partial signal, and a third partial signal, the first partial signal generating a magnetic force of the first polarity in the coil, the second partial signal generating a magnetic force of the second polarity in the coil after the first partial signal, the third partial signal generating a magnetic force of the first polarity in the coil after the second partial signal.

(5) In (3), the drive circuit does not output a drive signal in the second driving method.

(6) In any one of (3) to (5), in the first driving method, the drive circuit outputs the second partial signal without outputting the first partial signal.

(7) In any one of (3) to (6), the control unit further includes a rank determining unit that detects a counter-electromotive current generated in the coil after the output of the first drive signal, determines a rotational force of the rotor based on the detected counter-electromotive current, and changes a rank indicating a strength of the first drive signal that is output by the drive circuit based on the determined rotational force.

(8) In (7), when the rank is a predetermined rank, the drive circuit outputs a signal for generating a magnetic force of the first polarity in the coil as the measurement drive signal, and outputs the second partial signal as the first drive signal, and when the rank corresponds to a signal stronger than the predetermined rank, the drive circuit outputs the first partial signal and the second partial signal as the first drive signal.

(9) In (7) or (8), the rank determining unit changes the rank based on whether a period in which a signal exceeding a threshold value is detected after the first drive signal is output is shorter than a predetermined period, and the rank determining unit changes the rank to a rank corresponding to a weaker signal when, in a period between the output of the first drive signal and the detection of the counter-electromotive current exceeding the threshold value, a counter-electromotive current having a polarity different from that of the counter-electromotive current exceeding the threshold value is detected.

(10) In any one of (7) to (9), the rank determining unit detects a counter-electromotive current generated in the coil after the output of the first drive signal, and determines whether the rotor has made a predetermined rotation based on the detected counter-electromotive current, and when it is determined that the rotor has not made the predetermined rotation, the drive circuit outputs a correction drive signal for rotating the rotor stronger than the first drive signal.

(11) In any of (1) to (10), the measurement drive signal, the drive circuit connects a circuit for detecting a counter-electromotive current with the coil by a phase detection pulse including a plurality of intermittent first partial pulses, and after the first drive signal is output, connects the circuit for detecting a counter-electromotive current with the coil by a rotation detection signal including a plurality of intermittent second partial pulses, and an output interval of the first partial pulses is smaller than the second partial pulses, or a period of applying each of the first partial pulse is longer than the second partial pulses.

Effects of the Invention

According to the present invention, it is possible to reliably reverse the step motor while reducing power dissipation.

BRIEF DESCRIPTION OF THE DRAWINGS

FIG. 7 is a diagram showing an example of waveform of a counter-electromotive current and voltages of terminals O1 and O2 in the case of the same phase;

FIG. 8 is a diagram showing an example of waveform of a counter-electromotive current and voltages of the terminals O1 and O2 in the case of the reversed phase;

FIG. 9 is a diagram showing an example of waveform of a counter-electromotive current and voltages of the terminals O1 and O2 in the case of non-rotation in the same phase;

FIG. 10 is a diagram showing a condition of the rotor in which detection of the reversed phase is not executed and in the case of the reversed phase;

FIG. 11 is a diagram showing another example of waveform of a counter-electromotive current and voltages of the terminals O1 and O2 in the case of the reversed phase;

FIG. 12 is a diagram showing another example of waveform of a counter-electromotive current and voltages of the terminals O1 and O2 in the case of the same phase;

FIG. 13 is a diagram showing another example of waveform of a counter-electromotive current and voltages of the terminals O1 and O2 in the case of the reversed phase;

FIG. 14 is a diagram showing another example of waveform of a counter-electromotive current and voltages of the terminals O1 and O2 in the case of the same phase;

FIG. 17 is a diagram showing an example of waveform of a counter-electromotive current and voltages of the terminals O1 and O2 when a precursor waveform is detected;

FIG. 18 is a diagram showing an example of waveform of a counter-electromotive current and voltages of the terminals O1 and O2 when an abnormal rotation occurs;

DESCRIPTION OF EMBODIMENTS

An embodiment of the present invention will be described below in detail with reference to the accompanying drawings. In the following, a case will be described in which the present invention is applied to a portable electronic watch 1.

First Embodiment

Figure 1:
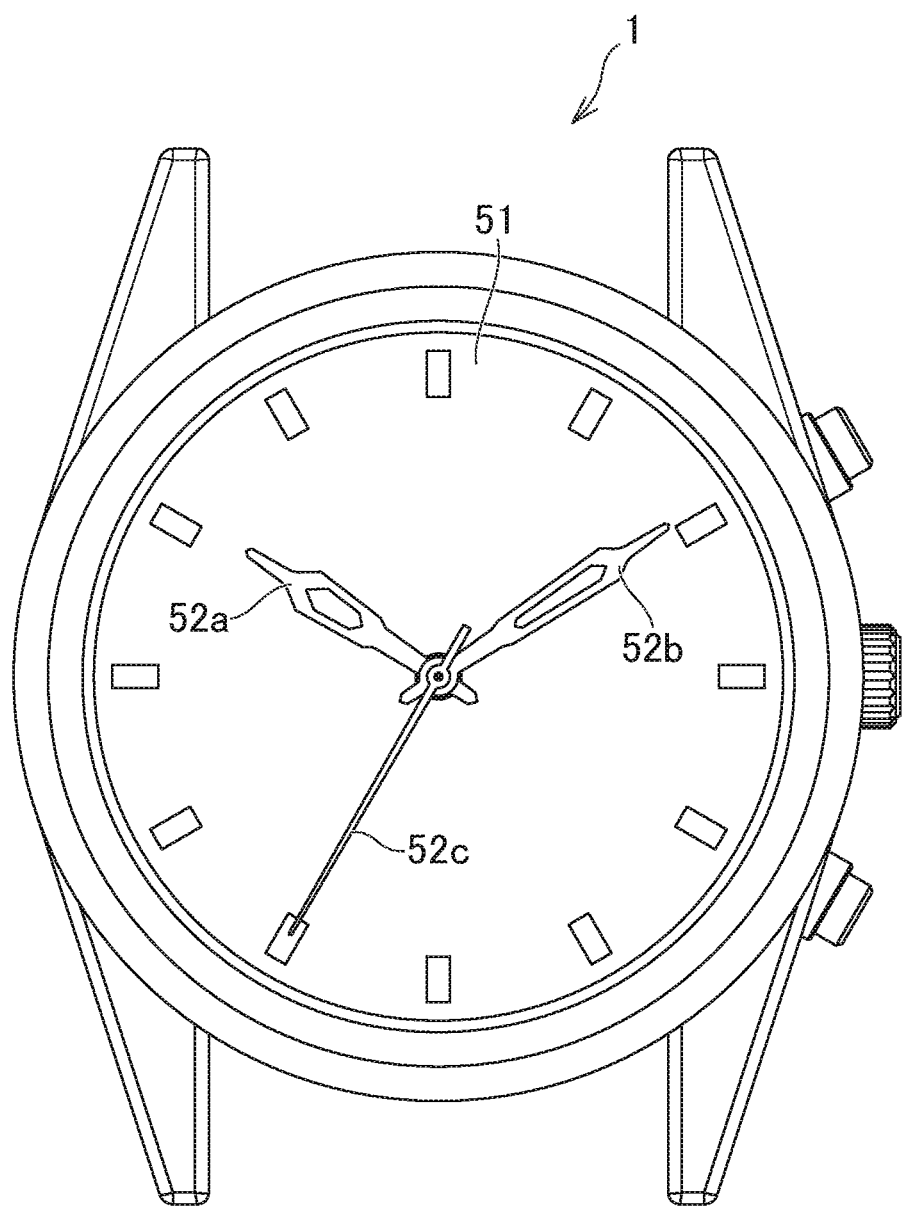
FIG. 1 is a plan view showing an example of an electronic watch according to a first embodiment.
Figure 2:
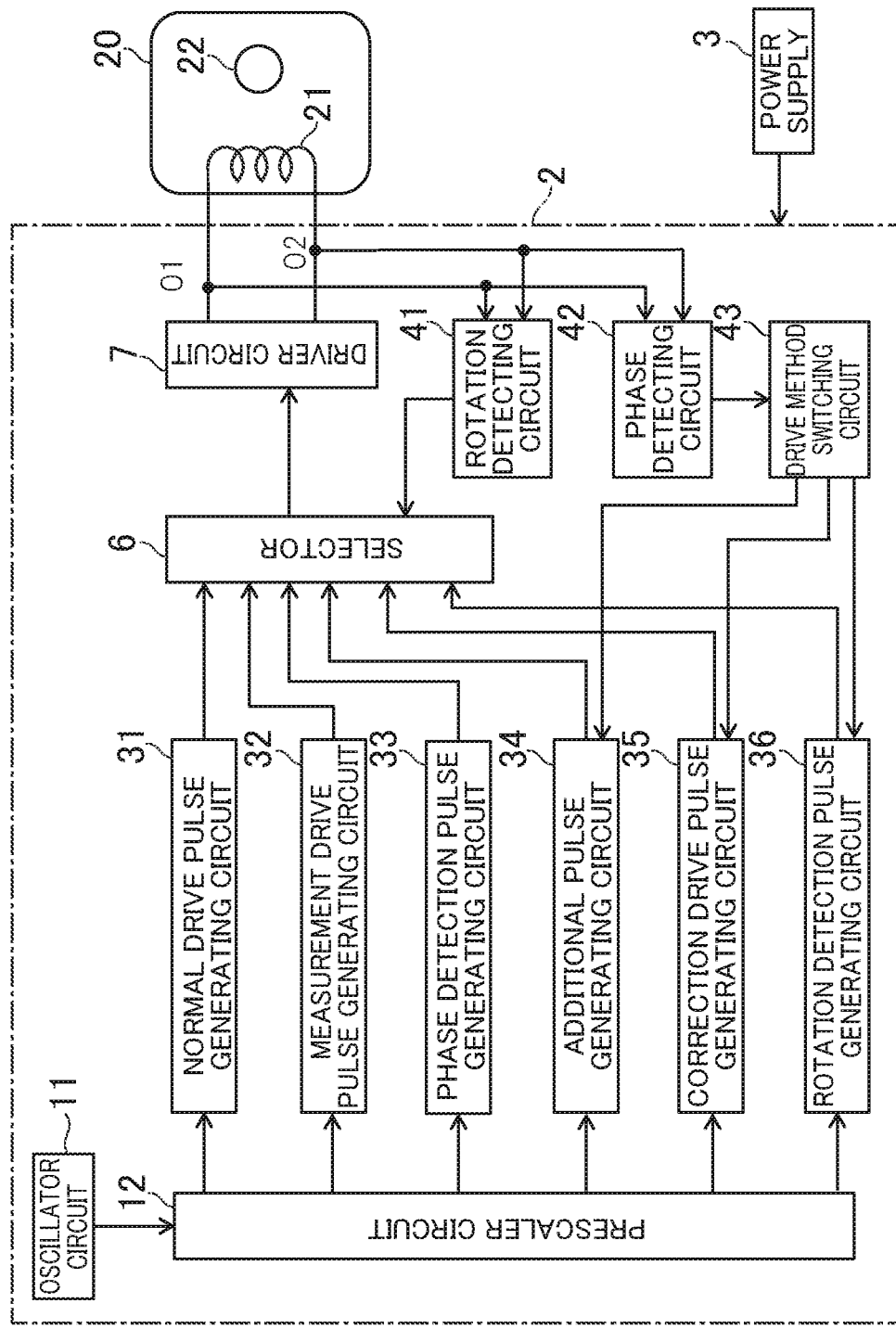
FIG. 2 is a block diagram showing a circuit configuration of the electronic watch according to the first embodiment.

FIG. 1 is a plan view showing an example of the electronic watch 1 of the first embodiment, and FIG. 2 is a diagram schematically illustrating a circuit configuration of the electronic watch 1. The electronic watch 1 is an electronic watch of an analog display system. The electronic watch 1 includes a dial 51, an hour hand 52a, a minute hand 52b, a second hand 52c, a motor control unit 2, a power supply 3, a step motor 20, and a wheel train (not shown). The step motor 20 includes a coil 21 and a rotor 22. The step motor 20 is mechanically connected to the wheel train. The power supply 3 includes, for example, a secondary battery.

The motor control unit 2 includes an oscillator circuit 11, a prescaler circuit 12, a normal drive pulse generating circuit 31, a measurement drive pulse generating circuit 32, a phase detection pulse generating circuit 33, an additional pulse generating circuit 34, a correction drive pulse generating circuit 35, a rotation detection pulse generating circuit 36, a selector 6, a driver circuit 7, a rotation detecting circuit 41, a phase detecting circuit 42, and a drive method switching circuit 43. The motor control unit 2 is implemented as an integrated circuit including a microcontroller, for example.

The oscillator circuit 11 outputs a predetermined clock signal by a quartz oscillator (not shown). The clock signal is fed into the prescaler circuit 12. The prescaler circuit 12 divides the frequency of the clock signal, and the clock signal divided by the prescaler circuit 12 is fed into the normal drive pulse generating circuit 31, the measurement drive pulse generating circuit 32, the phase detection pulse generating circuit 33, the additional pulse generating circuit 34, the correction drive pulse generating circuit 35, and the rotation detection pulse generating circuit 36.

When starting the reverse driving of the step motor 20, the measurement drive pulse generating circuit 32 generates a measurement drive pulse G for generating a magnetic field in the coil 21, the magnetic field has a predetermined direction (polarity) in the rotor 22. The phase detection pulse generating circuit 33 generates a phase detection pulse GP for detecting a counter-electromotive current caused by the movement of the rotor 22 after the output of a measurement drive signal. If the phase assumed by the motor control unit 2 and the phase of the rotor 22 are the same, the normal drive pulse generating circuit 31 generates and outputs a drive pulse SP for driving the step motor 20 in the reverse direction. The rotation detection pulse generating circuit 36 generates and outputs a rotation detection pulse DP for detecting a rotation. The correction drive pulse generating circuit 35 generates and outputs a correction pulse FP for reliably rotating the step motor 20 when the step motor 20 is not rotated or the rotation is uncertain. The driving force of the rotor 22 by the correction pulse FP is larger than the driving pulse SP. If the phase assumed by the motor control unit 2 and the phase of the rotor 22 are opposite, the additional pulse generating circuit generates and outputs a signal (additional pulse C) for matching the phase assumed by the motor control unit 2 and the phase of the rotor 22.

The selector 6 receives the measurement drive pulse G, the drive pulse SP, the correction pulse FP, the additional pulse C, the phase detection pulse GP, and the rotation detection pulse DP. The selector 6 then outputs one of these pulses to the driver circuit 7 based on the control of the logic circuit or the microcontroller included in the motor control unit 2.

The driver circuit 7 supplies a drive signal corresponding to any one of the measurement drive pulse G, the drive pulse SP, the correction pulse FP, and the additional pulse C entered from the selector 6 to the terminals O1 and O2 of the coil 21 of the step motor 20 to drive the step motor 20. Upon receiving the rotation detection pulse DP from the selector 6, the driver circuit 7 controls a switch provided between the coil 21 and the rotation detecting circuit 41 to input the counter-electromotive current generated in the O1 and O2 terminals of the coil 21 to the rotation detecting circuit 41. Upon receiving the phase detection pulse GP from the selector 6, the driver circuit 7 controls a switch provided between the coil 21 and the phase detecting circuit 42 to input the counter-electromotive current generated in the O1 and O2 terminals of the coil 21 to the phase detecting circuit 42.

The rotation detecting circuit 41 is a circuit that detects a counter-electromotive current generated in the coil 21 when the rotation detection pulse DP is input to the driver circuit 7. The rotation detecting circuit 41 includes a comparator, for example, and detects whether the counter-electromotive current exceeding a threshold value dVt, which is determined based on the detection resistance, is generated. Further, the rotation detecting circuit 41 determines whether the rotor 22 is rotated backward to the next step based on the detected counter-electromotive current. If it is determined that the rotor 22 is not rotated backward, the rotation detecting circuit 41 controls the selector 6 to input the correction pulse FP to the driver circuit 7.

The phase detecting circuit 42 is a circuit that detects a counter-electromotive current generated in the coil 21 when the phase detection pulse GP is input to the driver circuit 7. The phase detecting circuit 42 includes a comparator, for example, and detects whether the counter-electromotive current exceeding a threshold value gVt, which is determined based on the detection resistance, is generated. Further, the phase detecting circuit 42 determines whether the phase of the rotor 22 is the same as (same phase) or the opposite to (reversed phase) the phase expected from the operation of the motor control unit 2 so far based on the detected counter electromotive current, the phase is the current phase estimated by the motor control unit 2 based on the operation in the previous step and stored in the memory etc.

The drive method switching circuit 43 switches the drive signal entered from the driver circuit 7 to the coil 21 based on the phase of the rotor 22 determined by the phase detecting circuit 42. Details of switching of the drive signal will be described later. The drive method switching circuit 43 may be implemented by a microcontroller.

Figure 3:
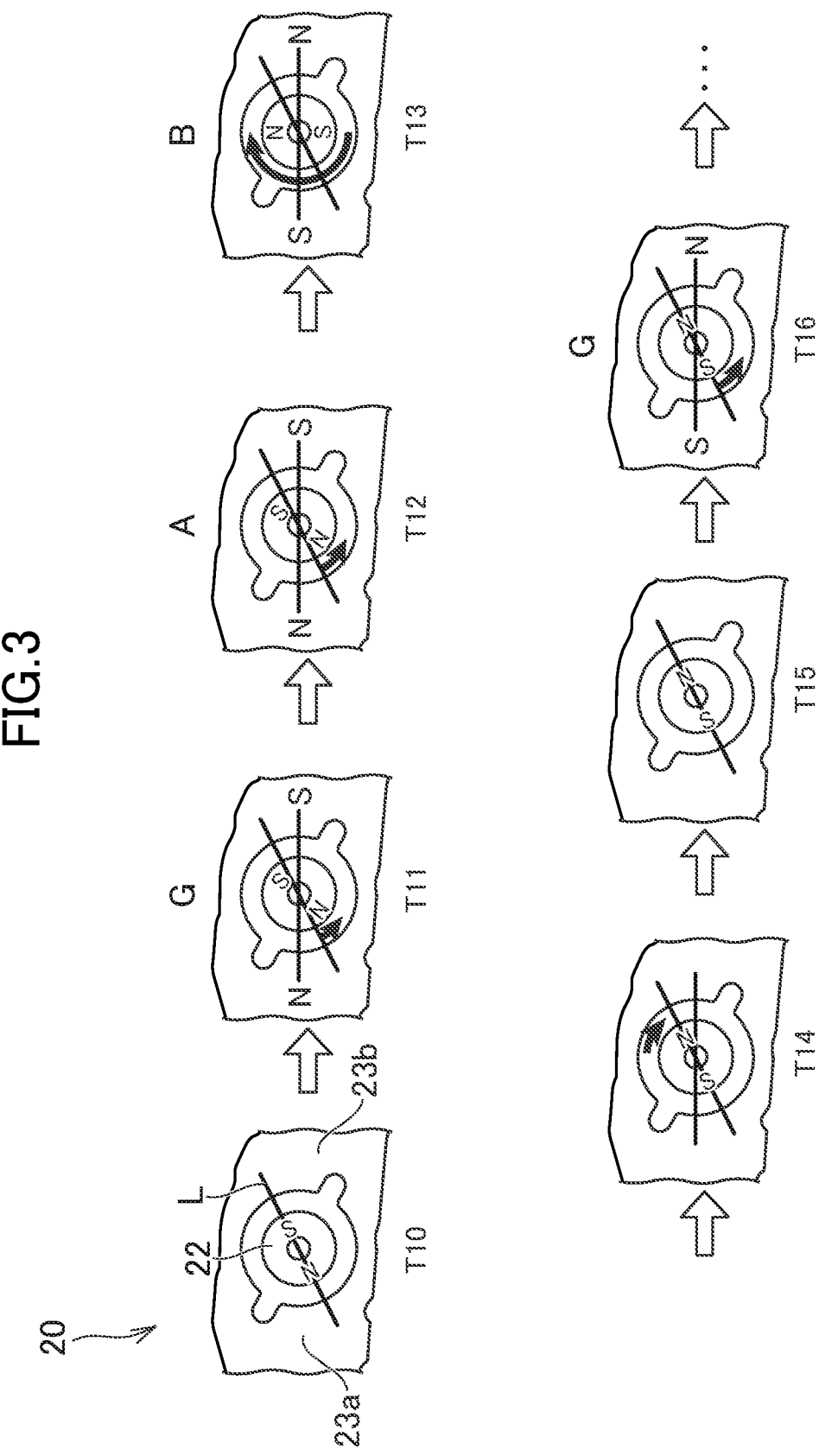
FIG. 3 is a diagram for explaining a rotation of a rotor in a case of same phase.

Next, an outline of the operation of the step motor 20 during the reverse rotation according to an embodiment of the present invention will be described. FIG. 3 is a diagram illustrating the rotation of the rotor 22 in the same phase, and showing changes in the rotor 22. The step motor 20 includes two stators 23a and 23b for transmitting a magnetic force to the rotor 22. The rotor 22 is magnetized by two poles of N and S, and the stators 23a and 23b are opposed across the rotor 22. The magnetic forces generated from one end and the other end of the coil 21 are respectively transmitted to the stators 23a and 23b. A straight line L in FIG. 3 indicates a position where the rotor 22 rests when the coil 21 does not generate a magnetic force, and passes through the N and S poles of the rotor 22 at rest. The straight line L extends in the direction in which the stators 23a and 23b are rotated by j° (j is less than 90 degrees) in the forward direction. The position where the rotor 22 rests is the center when the rotor 22 freely vibrates while being damped, and will be described as "stable position" hereinafter. One step of the step motor 20 is a half rotation, and the rotor 22 reaches a stable position every half rotation.

The time T10 is an initial state, and the rotor 22 rests at a stable position. At the time T11, the measurement drive pulse G is input to the driver circuit 7, and the measurement drive signal is fed into the coil 21. The coil 21 transmits a magnetic force of the first polarity to the rotor 22 through the stators 23a and 23b. The magnetic pole of the rotor 22 and the stators 23a and 23b repel each other due to the magnetic force of the first polarity at the time T11 and in the case of the same phase. With this, the rotor 22 slightly rotates in the forward direction. Subsequently, the phase detection pulse GP is input to the driver circuit 7, and the phase of the rotor 22 is determined by the phase detecting circuit 42. Here, it is determined that the phase of the rotor 22 is the same as the expected phase (same phase).

Next, in the case of the same phase, the drive pulse SP is input to the driver circuit 7, and the coil 21 is supplied with a drive signal to rotate the rotor 22 backward to the next step. At the time T12, a pulse A included in the drive pulse SP is supplied to the driver circuit 7, and accordingly, the magnetic force of the first polarity is generated in the coil 21 by a partial drive signal output by the driver circuit 7. The magnetic force is transmitted to the rotor 22. The rotor 22 is rotated in the forward direction so as to be larger than the case of the measurement drive pulse G and not to reach the one step. At the time T13, a pulse B included in the drive pulse SP is supplied to the driver circuit 7, and accordingly, the magnetic force of the second polarity, which is opposite to the first polarity, is generated in the coil 21 by the partial drive signal output by the driver circuit 7. The magnetic force is transmitted to the rotor 22. Due to the magnetic force of the second polarity, the magnetic pole of the rotor 22 and the stators 23a and 23b are attracted to each other at the time T13 and in the case of the same phase. Due to the magnetic force of the second polarity, the rotor 22 rotates in the reverse direction, and is reversed by inertia to the next step (time T14), and eventually rests at the stable position of the next step (time T15). Because the polarity of the rotor 22 is inverted, when the rotor 22 is further reversed another one step, the magnetic force of the opposite polarity to the previous step is supplied from the coil 21 (see time T16).

Figure 4:
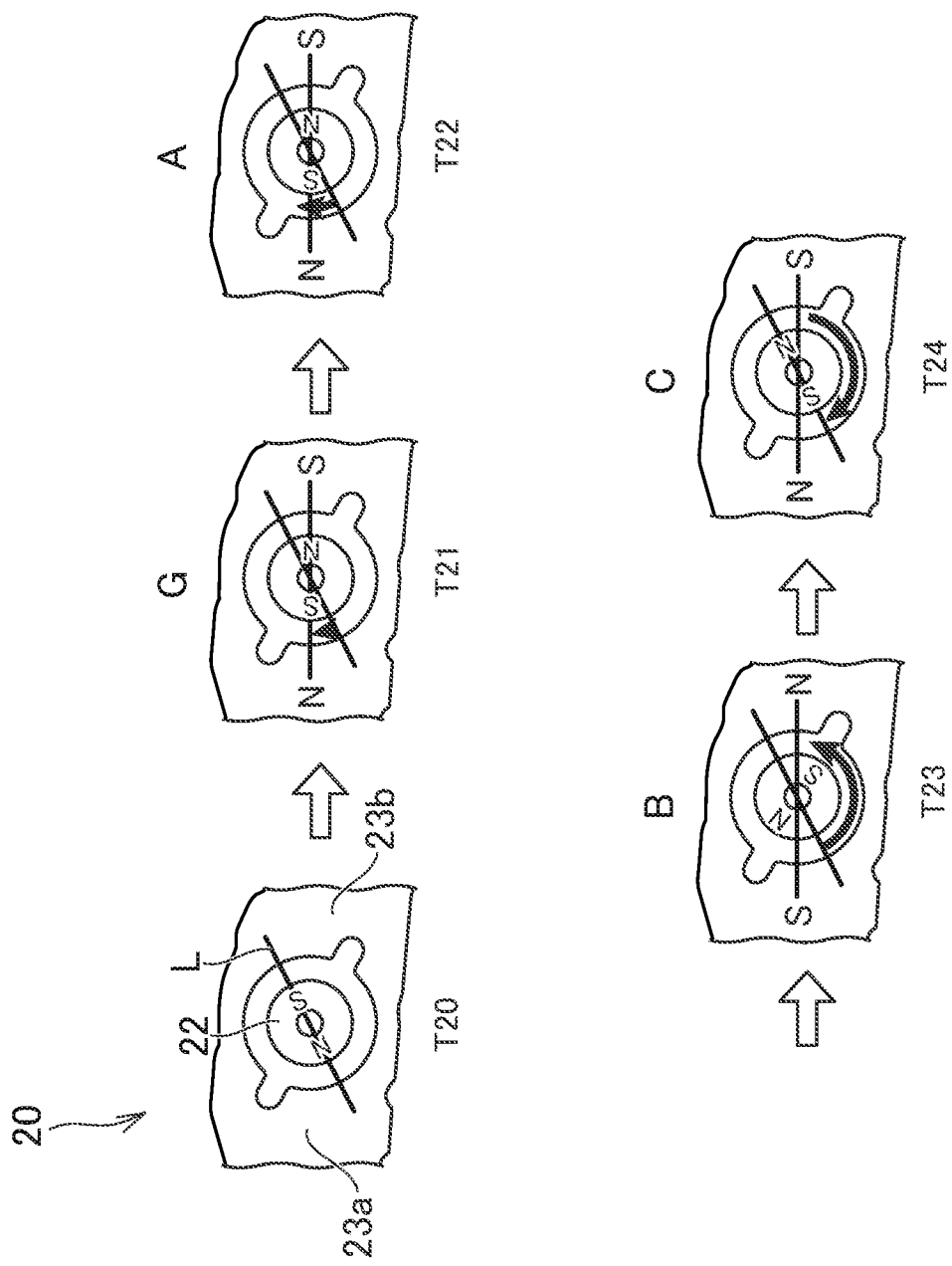
FIG. 4 is a diagram showing an operation of the rotor in a case of reversed phase.

FIG. 4 is a diagram showing the operation of the rotor 22 in the case of the reversed phase. The time T20 is an initial state, and the rotor 22 rests at a stable position. Here, the phase expected from the operation of the motor control unit 2 is the state at the time T10 in FIG. 3, and the phase of the rotor 22 at the time T20 is opposite (reversed phase) to the phase expected from the operation of the motor control unit 2.

At the time T21, the measurement drive pulse G is input to the driver circuit 7, and the measurement drive signal is fed into the coil 21. The coil 21 transmits the magnetic force of the first polarity to the rotor 22 through the stators 23a and 23b. The first polarity is the same as in the case of the same phase, and the rotor 22 is the reversed phase at the time T21. As such, the magnetic pole of the rotor 22 and the stators 23a and 23b are attracted to each other in the first polarity, and the rotor 22 rotates slightly in the reverse direction. Subsequently, the phase detection pulse GP is input to the driver circuit 7, and the phase of the rotor 22 is determined by the phase detecting circuit 42. Here, the phase of the rotor 22 is determined to be opposite (reversed phase) to the expected phase.

Next, in the case of the reversed phase, the drive pulse SP and the subsequent additional pulse C are input to the driver circuit 7, and the driver circuit 7 prevents the rotation of the rotor 22 to the next step. At the time T22, the pulse A included in the drive pulse SP is supplied to the driver circuit 7, and the magnetic force of the first polarity is transmitted from the coil 21 to the rotor 22 accordingly. The rotor 22 is rotated in the reverse direction so as to be larger than the case of the measurement drive pulse G and not to reach the one step. At the time T23, the pulse B included in the drive pulse SP is supplied to the driver circuit 7, and the magnetic force of the second polarity opposite to the first polarity is transmitted from the coil 21 to the rotor 22 accordingly. The magnetic pole of the rotor 22 and the stators 23a and 23b repel each other due to the magnetic force of the second polarity at the time T23 and in the case of the reversed phase. The rotor 22 rotates in the forward direction due to the magnetic force of the second polarity (time T23).

At the time T24, the additional pulse C is input to the driver circuit 7, and the magnetic force of the first polarity is transmitted from the coil 21 to the rotor 22. Due to the magnetic force of the first polarity, the magnetic pole of the rotor 22 and the stators 23a and 23b repel each other at the time T24 and in the case of the reversed phase, and the rotor 22 rotates in the reverse direction. As such, the rotor 22 eventually rests at the same stable position as the stable position before the measurement drive pulse G is supplied. The driving pulse SP and the subsequent additional pulse C are the same as those shown in Patent Literature 1, i.e. a reverse pulse for reverse rotation similar to the conventional technology is output following the measurement drive pulse G in the case of the reversed phase. If the phase detecting circuit 42 erroneously determines the state of the same phase to be the reversed phase and the additional pulse C is input to the driver circuit 7 after the drive pulse SP (after the time T13 in FIG. 3), the magnetic pole of the rotor 22 and the stators 23a and 23b are attracted to each other due to the magnetic force of the first polarity, and the rotor 22 eventually rests at the stable position that is reversed one step. That is, the positions of the hands do not deviate even if the additional pulse C is erroneously output in the same phase. Further, in the example of FIG. 4, the drive pulse SP and the subsequent additional pulse C are output when it is determined that the phase is the reversed phase, although these pulses may not be output instead. That is, in the example of FIG. 4, one step is completed at the time T21, and thus the rotor 22 eventually rests at the same stable position as the stable position before the measurement drive pulse G is supplied.

Figure 5:
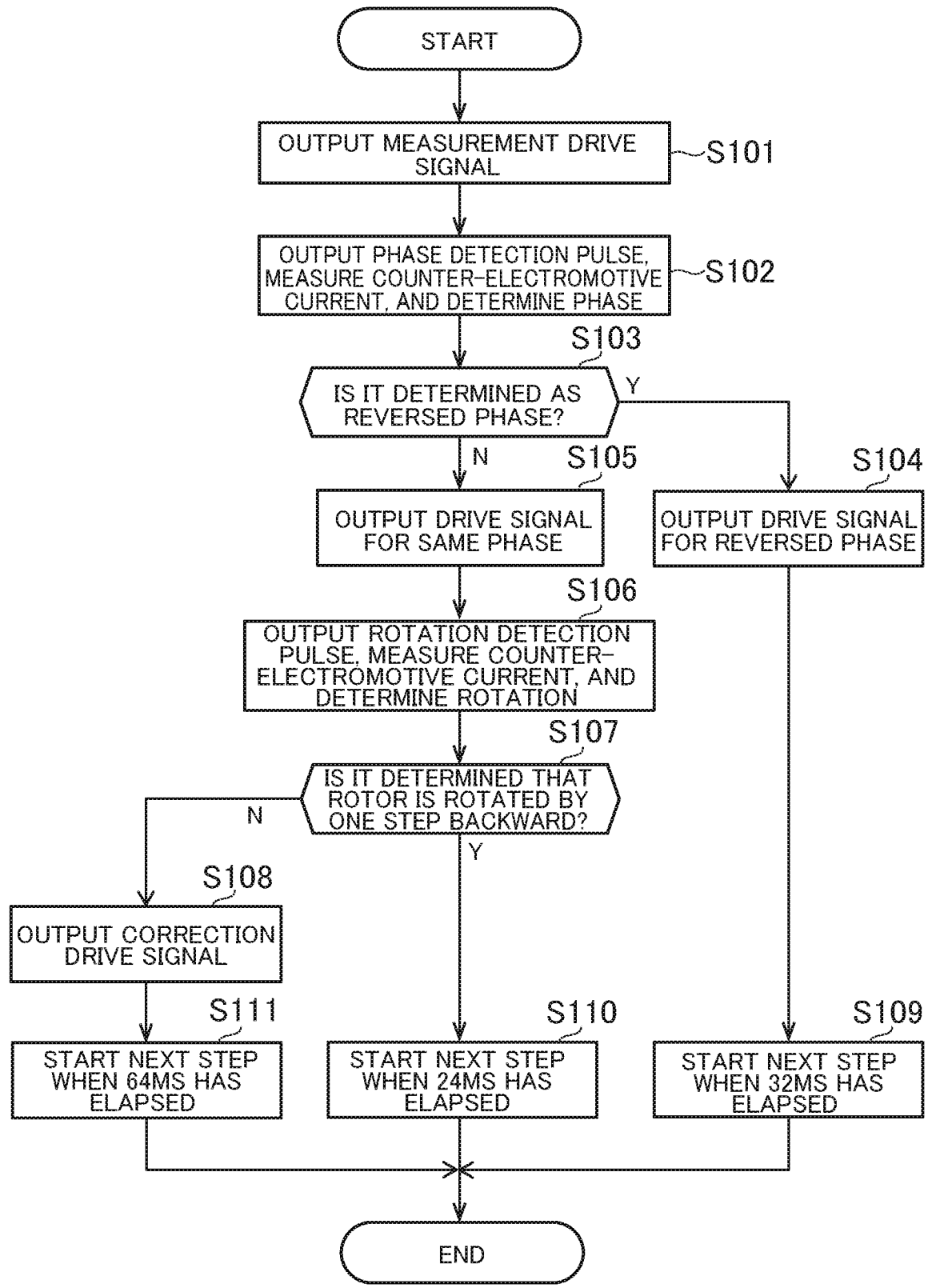
FIG. 5 is a flowchart of processing of reverse rotation according to the first embodiment.
Figure 6:
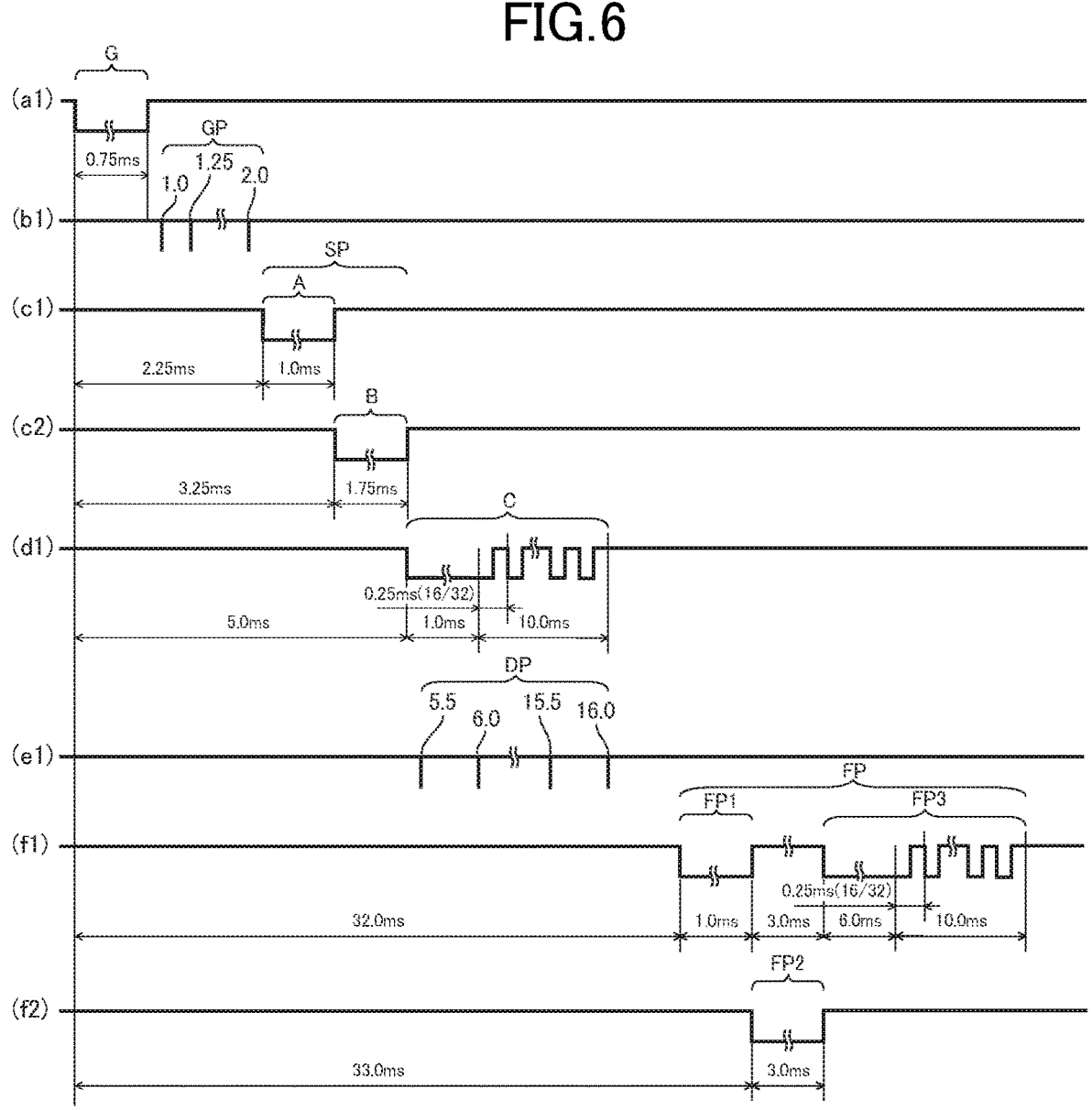
FIG. 6 is a waveform diagram showing an example of pulses output during the reverse rotation in one step.

Next, the control at the time of the reverse rotation will be described in more detail. FIG. 5 is a flow chart of the processing of the reverse rotation according to the first embodiment. FIG. 6 is a waveform diagram showing an example of pulses output during the reverse rotation in one step. In FIG. 6, a1 shows a waveform of a signal output from the measurement drive pulse generating circuit 32 toward the terminal O1 of the coil 21, and b1, c1, d1, e1, and f1 respectively show waveforms of signals output from the phase detection pulse generating circuit 33, the normal drive pulse generating circuit 31, the additional pulse generating circuit 34, the correction drive pulse generating circuit 35, and the rotation detection pulse generating circuit 36 toward the terminal O1. c2 and f2 shows waveforms of signals respectively output from the normal drive pulse generating circuit 31 and the correction drive pulse generating circuit 35 toward the terminal O2. In each step, the waveform of the signal output from the terminal O2 and the waveform of the signal output from the terminal O1 are switched.

First, the measurement drive pulse generating circuit 32 generates a measurement drive pulse G, and the driver circuit 7, to which the measurement drive pulse G is input, outputs a measurement drive signal to the coil 21 (step S101). When the measurement drive signal is output, as shown in T11 in FIG. 3 and T21 in FIG. 4, the rotor 22 rotates in a direction corresponding to a phase at that time. Subsequently, the phase detection pulse generating circuit 33 outputs a phase detection pulse GP, the driver circuit 7 connects the terminal O1 of the coil 21 and the phase detecting circuit 42, the phase detecting circuit 42 measures the counter-electromotive current generated in the coil 21, and the phase detecting circuit 42 determines the phase of the rotor 22 based on the measured counter-electromotive current (step S102).

As shown in FIG. 6, the phase detection pulse GP is composed of a plurality of partial pulses output at predetermined intervals, and each partial pulse is applied for a short time (16 μs). In FIG. 6, numbers shown in respective partial pulses indicate the timing at which the partial pulse are output where the time at which the measurement drive pulse generating circuit 32 starts outputting the measurement drive pulse G is 0. The counter-electromotive current is measured at the time when a partial pulse is output.

More specifically, in step S102, the phase detecting circuit 42 determines that the rotor 22 is in the same phase when the voltage (corresponding to the counter-electromotive current) exceeding the threshold vale gVt is measured twice or more, and if not, determines that the rotor 22 is in the reversed phase. FIG. 7 is a diagram showing an example of waveform of the counter-electromotive current and voltages of the terminals O1 and O2 in the case of the same phase. In FIG. 7, a plurality of lines depicted as the phase detection pulse GP show the strength of the counter-electromotive current at the time when the partial pulses included in the phase detection pulse GP are output. In the example of FIG. 7, after the output of the measurement drive pulse G, the counter electromotive current greater than the threshold value gVt is measured in two of the five partial pulses of the phase detection pulse GP, and the phase detecting circuit 42 determines that the phase of the rotor 22 is the same as the expected phase (in the same phase).

FIG. 8 is a diagram showing an example of waveform of the counter-electromotive current and the voltages of the terminals O1 and O2 in the case of the reversed phase, and corresponds to FIG. 7. In the example of FIG. 8, after the output of the measurement drive pulse G, the counter-electromotive current exceeding the threshold gVt is not measured in any of the five partial pulses of the phase detection pulse GP, and the phase detecting circuit 42 determines that the phase of the rotor 22 is different from the expected phase (in the reversed phase).

When it is determined to be the reversed phase (Y in step S103), the driver circuit 7 outputs a drive signal for the reversed phase based on the control of the drive method switching circuit 43 (step S104). More specifically, after the normal drive pulse generating circuit 31 outputs the drive pulse SP shown in c1 and c2 of FIG. 6, the drive method switching circuit 43 controls the additional pulse generating circuit 34 to output the additional pulse C shown in d1 of FIG. 6, and further controls the selector 6 to input the drive pulse SP and the additional pulse C to the driver circuit 7, to thereby controls the driver circuit 7 to output the drive signal for the reversed phase. As shown in FIG. 6, the additional pulse C has a section (1.0 ms) to which a potential (full pulse) corresponding to the power supply voltage is applied and, subsequently, a section (10.0 ms) to which a pulse signal with a duty ratio of 16/32 is applied in a 0.25 ms cycle. As shown in the time from T22 to T24 in FIG. 4, the drive signal for the reversed phase prevents the rotor 22 from rotating forward in the reversed phase.

In this condition, for example, the positions of the hands stored in the memory in the motor control unit 2 are different from the positions of the actual hands. However, the difference can be easily corrected by separately providing a position detecting mechanism to detect that the hand reaches the specific position. After the step S104, the motor control unit 2 waits until 32 ms has elapsed from the start of the output of the measurement drive pulse G, and then starts the processing such as the reverse rotation of the next step (step S109). The standby time from the start of the output of the measurement drive pulse G to the end of the standby is set according to the time at which the vibration of the rotor 22 stops.

On the other hand, when it is determined to be the same phase (N in step S103), the driver circuit 7 outputs a drive signal for the same phase based on the control of the drive method switching circuit 43 (step S105). More specifically, the drive method switching circuit 43 controls the normal drive pulse generating circuit 31 to output the drive pulse SP shown in c1 and c2 of FIG. 6, but does not control the additional pulse generating circuit 34 to output the additional pulse C. The drive method switching circuit 43 controls the selector 6 to input the driving pulse SP to the driver circuit 7. This causes the driver circuit 7 to output a drive signal for the same phase. As shown in the time from T12 to T14 in FIG. 3, the rotor 22 rotates in the reversed direction by one step by the drive signal for the same phase.

Further, after the normal drive pulse generating circuit 31 outputs the drive pulse SP, the drive method switching circuit 43 controls the rotation detection pulse generating circuit 36 to generate a rotation detection pulse DP, and controls the selector 6 to output the rotation detection pulse DP to the driver circuit 7 (step S106). The driver circuit 7 connects the terminal O1 of the coil 21 with the rotation detecting circuit 41 based on the rotation detection pulse DP, and the rotation detecting circuit 41 measures the counter-electromotive current generated in the coil 21 and determines whether the rotor 22 rotates in the reverse rotation by one step based on the measured counter-electromotive current (step S106).

As shown in FIG. 6, the rotation detection pulse DP is composed of a plurality of partial pulses output at predetermined intervals, and each partial pulse is applied for a short time (16 μs). In FIG. 6, numbers shown in respective partial pulses indicate the timing at which the partial pulse are output where the time at which the measurement drive pulse generating circuit 32 starts outputting the measurement drive pulse G is 0. The counter-electromotive current is measured at the time when a partial pulse is output.

As shown in FIG. 6, the intervals at which the partial pulses of the phase detection pulse GP is output are shorter than the intervals of the rotation detection pulse DP. This enhances the accuracy of the detection because the counter-electromotive current is difficult to be output in the period of the phase detection pulse GP. Further, these phase detection pulse GP and rotation detection pulse DP put the coil in a state of high impedance, and detect and determine the induced voltage generated in the coil by the free vibration of the rotor 22. By maintaining the high impedance state, an induced electromotive force to generate a magnetic field in a direction that prevents a change in magnetic flux generated by the free vibration of the rotor 22, that is, an electromagnetic brake, is not generated in the coil. As such, by shortening the intervals at which the partial pulses are output, the electromagnetic brake based on the electromagnetic induction is suppressed, and the effect of increasing the counter-electromotive current based on the rotation of the rotor 22 can be provided. At this time, the interval at which the partial pulses of the phase detection pulse GP are output is made shorter, although an applied width (16 μs) of a single partial pulse may be larger than the rotation detection pulse DP. The same effect can be expected in this case as well.

In step S106, more specifically, the rotation detecting circuit 41 determines that the rotor 22 is rotated by one step in the reverse direction when the voltage exceeding the threshold value dVt (corresponding to the counter-electromotive current) is measured four or more times, otherwise determines that the rotor 22 is not rotated. In the example of FIG. 7, the voltage greater than the threshold value dVt is measured in five of the partial pulses of the rotation detection pulse DP, and thus the rotation detecting circuit 41 determines that the rotor 22 is rotated by one step in the reverse direction. The output of the rotation detection pulse DP may be terminated when there are five voltages above the threshold value dVt. Further, the timing of starting output of the driving pulse of the next step may be sequentially switched starting from the end of the output of the rotation detection pulse DP. This serves to increase the speed at the time of high-speed hand movement. In FIG. 7, a plurality of lines depicted as the rotation detection pulse DP show the strength of the counter-electromotive current at the time when the partial pulses included in the rotation detection pulse DP are output. In this example, the rotor 22 is substantially converged to a position where the rotor 22 is rotated by half in the reverse direction at the time of 10 ms elapse.

FIG. 9 is a diagram showing an example of waveform of the counter-electromotive current and the voltages of the terminals O1 and O2 in the case of non-rotation in the same phase. In the example of FIG. 9, the counter-electromotive current greater than the threshold value gVt is measured in two of the five partial pulses of the phase detection pulse GP and determined to be the same phase. On the other hand, the number of times the voltage exceeding the threshold value dVt is measured among the partial pulses of the rotation detection pulse DP is less than four, and thus the rotation detecting circuit 41 determines that the rotor 22 is not rotated. As such, in the example of FIG. 9, the correction pulse FP is output from 32 ms although not shown. The rotation detecting circuit 41 may determine whether the rotor is rotated or not based on the timing at which the voltage exceeding the threshold value dVt is detected for the first time. For example, in the example of FIG. 6, when the rotor is rotated, the rotation detecting circuit 41 detects a voltage at the first partial pulse from the start of the output of the rotation detection pulse DP, and when the rotor is not rotated in FIG. 9, detects a voltage for the first time at the sixth partial pulse from the start of the output of the rotation detection pulse DP. For example, the rotation detecting circuit 41 may use the third partial pulse from the start of the output of the rotation detection pulse DP as a reference, and determine rotation or non-rotation based on whether the voltage is detected for the first time to the reference. Further, the rotation detecting circuit 41 may determine rotation or non-rotation based on the combination of the timing at which the voltage is detected and the number of detections.

In the example of FIG. 9, while the counter-electromotive current greater than the threshold value dVt is not seen at the time of start of the output of the rotation detection pulse DP, the detection signal of the voltage close to the threshold value dVt is seen. As such, there is a possibility that erroneous determination occurs depending on the situation by the mere count of the number of detections. The rotation detecting circuit 41 determines rotation or non-rotation based on the number of detections that are continuously detected instead of simply determining based on the number of detections within a period, and the accuracy of the determination is thereby increased.

If it is determined that the rotor is rotated by one step in the reverse direction in the step S106 (Y of the step S107), the motor control unit 2 waits until 24 ms has elapsed from the start of the output of the measurement drive pulse G, and then starts the processing such as the reverse rotation of the next step (step S110). The standby time from the start of the output of the measurement drive pulse G to the end of standby is set according to the time required at which the vibration of the rotor 22 stops. Such time is shorter than the time in the step S109 because the additional pulse C is not output.

If it is determined that the rotor is not rotated in the reverse direction in the step S106 (N in the step S107), the rotation detecting circuit 41 controls the selector 6 to input the correction pulse FP generated by the correction drive pulse generating circuit 35 to the driver circuit 7, and the driver circuit 7 outputs a correction drive signal (step S108). As shown in FIG. 6, the correction pulse FP has a pulse FP1, pulse FP2, and pulse FP3. The pulse FP1, pulse FP2, and pulse FP3 respectively correspond to the pulse A, pulse B, and additional pulse C, although at least a portion of the pulse FP1, pulse FP2, and pulse FP3 is longer than the corresponding pulse in order to increase the driving force of the correction drive signal. The step motor 20 can be reliably operated by the correction pulse FP even when the step motor 20 cannot be reversely rotated due to an external load, such as the operation of the calendar.

When the correction drive signal is output, the motor control unit 2 waits until 64 ms has elapsed from the start of output of the measurement drive pulse G, then starts the processing such as the reverse rotation of the next step (step S111). The standby time is longer than the time in the step S109 because the correction pulse FP is output. The standby time is a value depending on whether the phase is the reversed phase or not and whether the rotation is performed, but may be a uniform time.

In the electronic watch 1 according to the present embodiment, the phase of the rotor 22 is detected based on the measurement drive pulse G and the phase detection pulse GP, and the drive signal corresponding to the phase of the rotor 22 is output. If the phase is not detected and the drive pulse SP in the case of the same phase is used to drive the step motor 20, the rotor 22 rotates forward, and also it is difficult to stop the rotation.

FIG. 10 is a diagram showing a condition of the rotor 22 in which the detection of the reversed phase in step S103 is not executed and in the case of the reversed phase, and corresponds to FIG. 4. Here, assume that the phase of the rotor 22 at the time T90 is opposite (reversed phase) to the phase expected from the operation of the motor control unit 2. In the example of FIG. 10, the phase is not detected, and thus the same drive signal as in the case of the same phase is also supplied in the case of the reversed phase. Accordingly, the additional pulse C is not supplied, and thus the rotor 22 is rotated in the forward direction at the time T93, and rotates forward by half rotation and rests at the stable position at the time T94.

On the other hand, if the rotor 22 is rotated in the reverse direction without any problem in the same phase, the rotor 22 is rotated by half rotation, and the phase expected in the next step is also the reversed phase. Then, in the case where the rotor is rotated by half rotation in the reversed phase, the phase is also reversed in the next step, and thus, the rotor 22 rotates further forward if the rotor is made to rotate backward by one step. As such, in this case, once the phase is reversed, it is difficult to correct the difference even if the position detection mechanism is used.

Assume that, in the case of the same phase, the drive pulse SP and the additional pulse C that are generated in the case of the reversed phase are also used to supply a drive signal to the step motor 20. In this case, the magnetic force generated by the additional pulse C is maintained in a state in which the rotor 22 is rotated backward in the case of the same phase, and the rotor 22 is returned to the initial stable position in the case of the reversed phase, so it is possible to rotate the rotor to the stable position similar to that of the present embodiment. However, in this case, it is necessary to output each time a drive signal by the additional pulse C having a relatively long period. This increases the power consumption and also the time required for rotation.

In the present embodiment, while performing the reverse rotation with low power consumption in the case of the same phase, difficulty in correction is prevented in the case of the reversed phase. This enables to reliably reverse the step motor 20 while reducing the power consumption of the electronic watch 1.

The method of driving the rotor 22 and the method of detecting the phase may be different from those described above. FIG. 11 is a diagram showing another example of waveform of the counter-electromotive current and voltages of the terminals O1 and O2 in the case of the reversed phase. FIG. 12 is a diagram showing another example of waveform of the counter-electromotive current and voltages of the terminals O1 and O2 in the case of the same phase. FIGS. 11 and 12 respectively correspond to FIGS. 8 and 7.

In the examples of FIGS. 11 and 12, the polarity of the measurement drive signal by the measurement drive pulse G is opposite to the examples of FIGS. 7 and 8. Accordingly, the coil 21 transmits the magnetic force of the second polarity through the stators 23a and 23b to the rotor 22. In the examples of FIGS. 11 and 12, the terminal in which the measurement drive signal is fed is O2, and the rotor 22 slightly rotates in the opposite direction to the examples of FIGS. 7 and 8. As such, as shown in FIG. 11, the phase detecting circuit 42 determines that the rotor 22 is the reversed phase when a voltage (corresponding to the counter-electromotive current) exceeding the threshold value gVt is measured twice or more, and the driver circuit 7 outputs a drive signal based on the drive pulse SP and the additional pulse C. On the other hand, as shown in FIG. 12, the phase detecting circuit 42 determines that the rotor 22 is the same phase when the voltage exceeding the threshold value gVt (corresponding to the counter-electromotive current) is not measured twice or more, and outputs a drive signal based on the drive pulse SP. In the examples of FIGS. 11 and 12, the pulse A has a section in which a pulse signal with a duty ratio 16/32 is applied. In the examples of FIGS. 11 and 12 as well, the phase of the rotor 22 can be detected, and it is possible to reliably reverse the step motor 20 while reducing the power consumption of the electronic watch 1.

The measurement drive pulse G and the pulse A included in the driving pulse SP may also be used in common. FIG. 13 is a diagram showing another example of waveform of the counter-electromotive current and voltages of the terminals O1 and O2 in the case of the reversed phase. FIG. 14 is a diagram showing another example of waveform of the counter-electromotive current and voltages of the terminals O1 and O2 in the case of the same phase. FIGS. 13 and 14 respectively correspond to FIGS. 8 and 7. In the examples of FIGS. 13 and 14, the measurement drive pulse G is supplied to the driver circuit 7, the driver circuit 7 outputs a measurement drive signal accordingly, a magnetic force of the first polarity is generated in the coil 21 by the measurement drive signal, and the magnetic force is transmitted to the rotor 22. The rotor 22 is rotated in the forward direction so as not to reach one step. Subsequently, the phase detection pulse generating circuit 33 outputs the phase detection pulse GP, and the phase detecting circuit 42 determines the phase of the rotor 22. Details of the method of determining the same phase or the reversed phase are the same as those described in the examples of FIGS. 7 and 8.

If it is determined to be the same phase, the pulse B included in the drive pulse SP is supplied to the driver circuit 7, and accordingly, the magnetic force of the second polarity, which is opposite to the first polarity, is generated in the coil 21 by the partial drive signal output by the driver circuit 7. The magnetic force is transmitted to the rotor 22 (see FIG. 14). The rotation caused by the measurement drive pulse G is replaced by the rotation by the pulse A, and thus, in this method as well, the rotor 22 can be rotated backward by one step. In this case, the rotational force of the rotor 22 is reduced as compared with the example of FIG. 7.

If it is determined to be the reversed phase, the pulse B included in the drive pulse SP is supplied to the driver circuit 7, and a magnetic force of the second polarity opposite to the first polarity is generated in the coil 21. Further, the additional pulse C is input to the driver circuit 7, and the magnetic force of the first polarity is transmitted from the coil 21 to the rotor 22 (see FIG. 13). Accordingly, as in the example of FIG. 8, the rotation of the rotor 22 is prevented.

Second Embodiment

The second embodiment of the present invention will be described below. The second embodiment differs from the first embodiment in that a drive rank, which indicates the strength of the drive signal, is adjusted. In the following, differences from the first embodiment will be mainly described.

Figure 20:
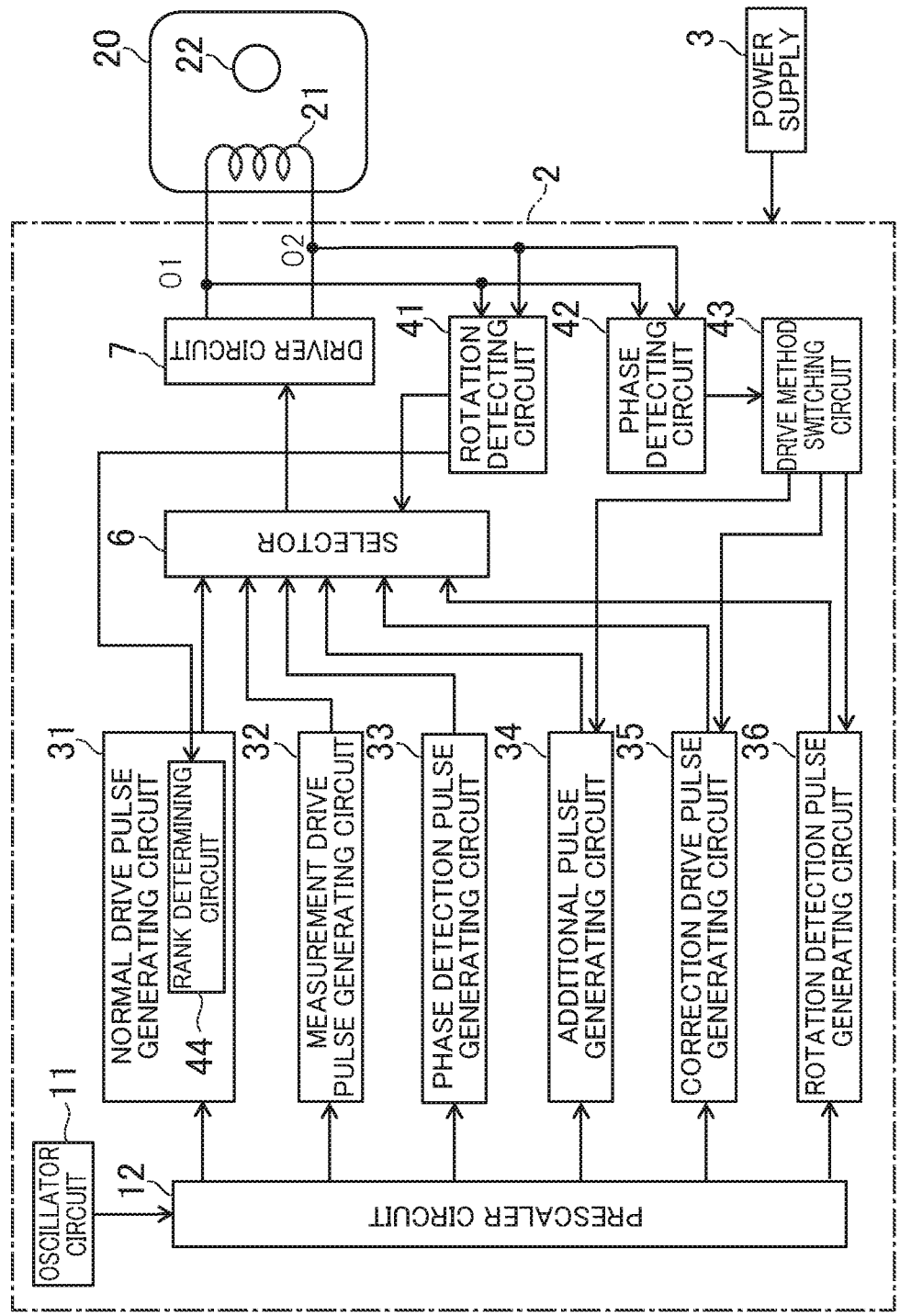
FIG. 20 is a block diagram showing a circuit configuration of the electronic watch according to the second embodiment.

FIG. 20 is a block diagram showing a circuit configuration of the electronic watch 1 according to the second embodiment, and corresponds to FIG. 2 of the first embodiment. In the second embodiment, the normal drive pulse generating circuit 31 includes a rank determining circuit 44, and the rank determining circuit 44 is connected to the rotation detecting circuit 41.

The rank determining circuit 44 determines the rotational force of the rotor 22 based on the counter-electromotive current detected after the drive signal corresponding to the drive pulse SP is output, and change the drive rank indicating the strength of the drive signal output from the driver circuit 7 based on the determined rotational force.

Figure 15:
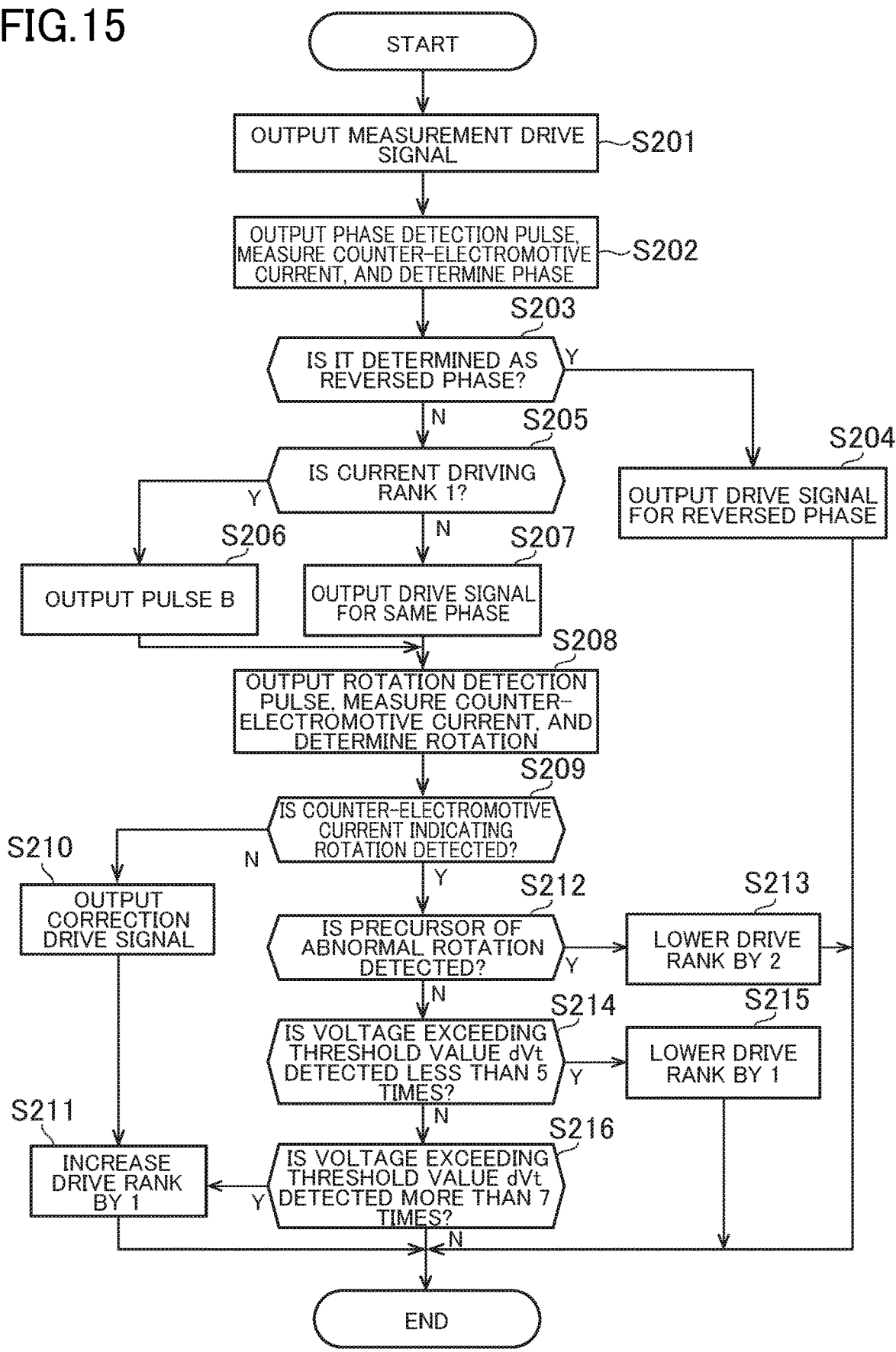
FIG. 15 is a flowchart of processing of reverse rotation according to a second embodiment.

FIG. 15 is a flow chart of the processing of the reverse rotation of the electronic watch 1 according to the second embodiment. First, the measurement drive pulse generating circuit 32 generates a measurement drive pulse G, and the driver circuit 7, in which the measurement drive pulse G is input, outputs a measurement drive signal to the coil 21 (step S201). Subsequently, the phase detection pulse generating circuit 33 outputs a phase detection pulse GP, and the phase detecting circuit 42 measures the counter-electromotive current generated in the coil 21. Further, the phase detecting circuit 42 determines the phase of the rotor 22 based on the measured counter-electromotive current (step S202). These processes are the same as those of S101 and S102 in the first embodiment, and therefore detailed descriptions thereof are omitted.

If it is determined to be the reversed phase (Y in step S203), the driver circuit 7 outputs a drive signal for the reversed phase based on the control of the drive method switching circuit 43 (step S204). The processing of step S204 is the same as the processing of step S104 of the first embodiment. Although not shown, similarly to the first embodiment, the motor control unit 2 waits until a predetermined period has elapsed from the start of output of the measurement drive pulse G, and then starts the processing such as the reverse rotation of the next step.

If it is determined to be the same phase, (N in step S203), the rank determining circuit 44 determines whether the current driving rank is 1, which is the lowest driving rank (step S205).

Figure 16:
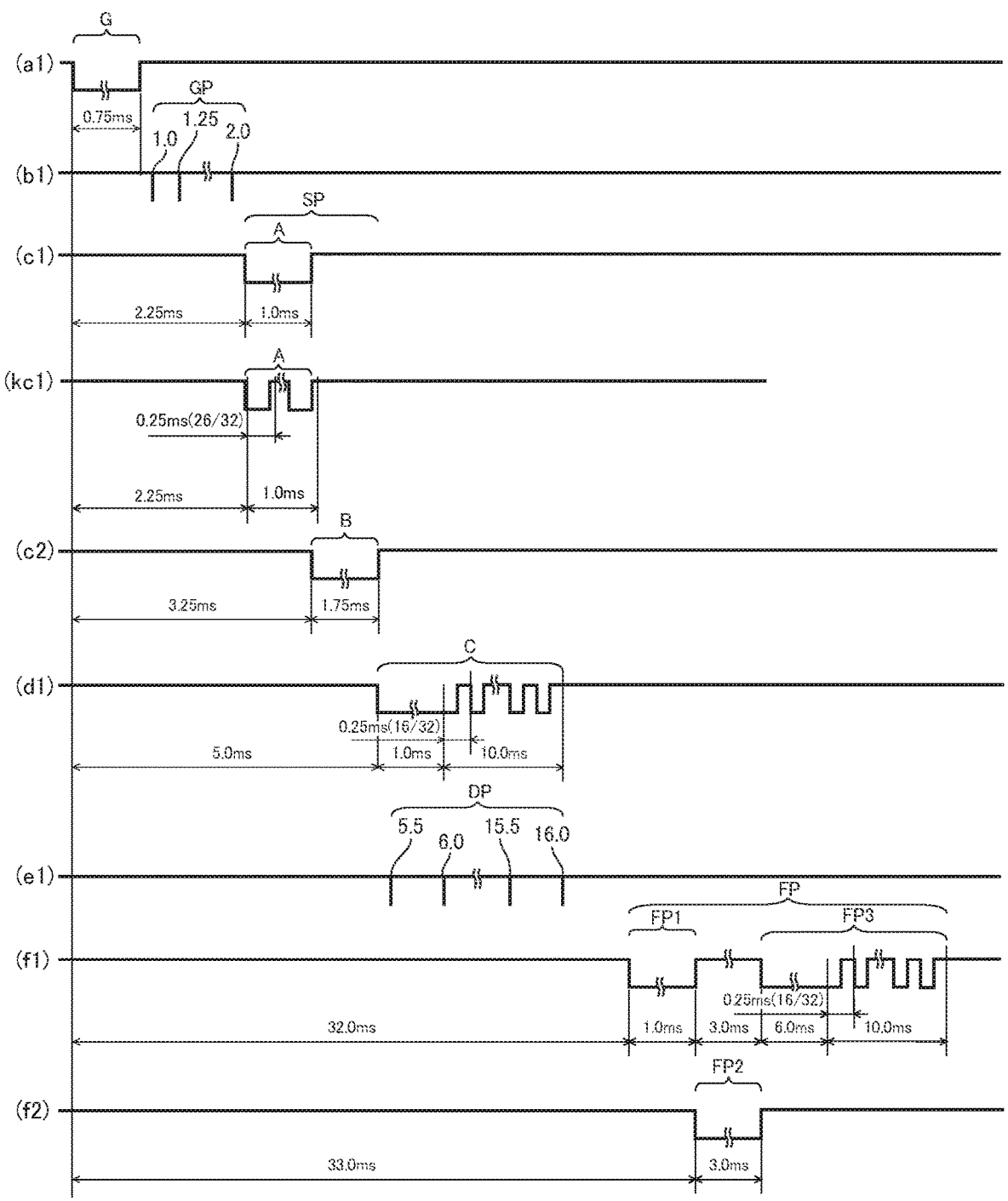
FIG. 16 is a waveform diagram showing examples of pulses output at the time of reverse rotation.

The drive rank will be described in further details. In this embodiment, the drive ranks range from 1 to 3. The driving signal output when the driving rank is 1 has the weakest driving force, and the driving force increases as the value of the driving rank increases. FIG. 16 is a waveform diagram showing examples of pulses output at the time of reverse rotation in the second embodiment, and corresponds to FIG. 6 of the first embodiment. In the example of FIG. 16, the pulse A shown in the waveform c1 when the drive rank is 3 is output from the normal drive pulse generating circuit 31. The pulse A shown in the waveform c1 is the same as that shown in FIG. 6, and the potential (full pulse) corresponding to the power supply voltage is applied throughout that period. If the drive rank is 2, a pulse A shown in the waveform kc1 with a duty ratio 26/32, which is smaller than the waveform c1, is output from the normal drive pulse generating circuit 31. If the drive rank is 1, the pulse A is not output.

The drive rank is used to reduce the occurrence of problems caused by changes in the driving force of the step motor 20 due to changes in the power supply voltage, for example. Details of the setting of the drive rank will be described later. The number of drive ranks may not have to be three, and may be two or more. For example, if the number of drive ranks is four or more, the duty ratio may be changed more finely in accordance with the drive rank.

If the current driving rank is 1 (Y in S205 of steps), the normal driving pulse generating circuit 31 does not output a pulse A in order to reduce the driving force, and outputs a pulse B toward the driver circuit 7. Accordingly, the selector 6 outputs the pulse B to the driver circuit 7 (step S206). The driver circuit 7 outputs a partial drive signal corresponding to the pulse B as a drive signal for the same phase based on the pulse B, and the magnetic force of the second polarity generated in the coil 21 is transmitted to the rotor 22. In the operation of S206 as well, similarly to the example of FIG. 14 in the first embodiment, the measurement drive pulse G is used in place of the pulse A included in the drive signal, and the rotor 22 can thereby rotate in the reverse direction. The timing of starting output of the subsequent signals, such as the pulse B, may be adjusted as appropriate, for example, to be earlier than the timing shown in FIG. 16 if the order is not changed.

If the current drive rank is not 1 (N in step S205), the normal drive pulse generating circuit 31 outputs a drive pulse SP corresponding to the drive rank, and the driver circuit 7 outputs a drive signal for the same phase of the strength corresponding to the drive rank (step S207). The driving force of the rotor 22 is thereby adjusted in accordance with the drive rank.

When the processing of step S206 or step S207 is executed, the rotation detection pulse generating circuit 36 outputs a rotation detection pulse DP to the driver circuit 7 (step S208). The rotation detecting circuit 41 measures the counter-electromotive current generated in the coil 21, and determines whether the rotor 22 rotates backward by one step based on the measured counter-electromotive current (step S208). If it is determined that the rotor is not rotated backward in the step S208 (N in the step S209), the correction pulse FP is input to the driver circuit 7, and the driver circuit 7 outputs a correction drive signal (step S210). In this case, the rank determining circuit 44 increases the drive rank by one, thereby facilitating the reverse rotation in the next step (step S211). The operations of the step S208 and the step S210 are the same as the operations of the step S106 and the step S108 of the first embodiment, and thus detailed descriptions thereof are omitted. Although not shown, similarly to the first embodiment, the operation of the next step starts after the step S211 and when the predetermined time has elapsed from the start of output of the measurement drive pulse G.

If it is determined that the rotor is rotated backward by one step in the step S208 (Y in step S209), the rotation detecting circuit 41 determines whether a precursor waveform X indicating a precursor of abnormal rotation is detected (step S212).

FIG. 17 is a diagram showing an example of a waveform diagram of the counter-electromotive current and the voltages of the terminals O1 and O2 in the same phase and when the precursor waveform X is detected. In the example of FIG. 17, the drive rank is high with respect to the power supply voltage, and thus the amount of rotation in the forward direction of the rotor 22 by the pulse A is increased. In this case, immediately after the output of the pulse B is completed and before the counter-electromotive current of a predetermined polarity (the same polarity as the partial drive signal by the pulse B) for rotation detection is detected, a precursor waveform X of the counter-electromotive current of the polarity opposite to the predetermined polarity is generated. In the example of FIG. 17, the number of times the voltage exceeding the threshold value dVt among the plurality of partial pulses of the rotation detection pulse DP is measured is four or more. Thus it is determined that the rotor is rotated by a half in the reverse direction. The rotor is rotated by a half in the reverse direction when viewed from the rotation angle of the rotor 22. However, when the rotational force of the rotor 22 is further increased by external factors, the rotor is likely to rotate in the forward direction due to the pulse A in the next step.

FIG. 18 is a diagram showing an example of waveform of the counter-electromotive current and the voltages of the terminals O1 and O2 when abnormal rotation occurs. In the example of FIG. 18, the power supply voltage is higher than the example of FIG. 17, and the rotor 22 is largely rotated in the forward direction by the pulse A, and then is half-rotated in the forward direction at the timing of outputting the pulse B.

The detection of the precursor waveform X will be described in more detail. Immediately after the generation of the pulse B, the rotation detection pulse generating circuit 36 outputs a precursor detection pulse EP, which is input to the driver circuit 7. The driver circuit 7 connects the terminal O2 of the coil 21 with the rotation detecting circuit 41, and the rotation detecting circuit 41 determines whether the voltage generated by the counter-electromotive current exceeds the threshold value eVt. The terminal of the coil 21 connected to the rotation detecting circuit 41 is different from the rotation detection pulse DP, and thus, if the voltage generated by the counter-electromotive current exceeds the threshold value eVt, the current of the polarity different from the counter-electromotive current applied to the rotation detection is detected. That is, the rotation detecting circuit 41 determines whether the precursor waveform X of abnormal rotation is detected by determining whether the voltage generated by the counter-electromotive current exceeds eVt.

When the precursor waveform X indicating a precursor of abnormal rotation is detected (Y in step S212), the rank determining circuit 44 lowers the drive rank by 2 (step S213). If the current drive rank is 2, the rank determining circuit 44 changes the drive rank to 1.

If the precursor of abnormal rotation is not detected (N in step S212), the rank determining circuit 44 adjusts the drive rank according to the number of times the voltage (corresponding to the counter-electromotive current) exceeding the threshold value dVt is measured among the plurality of rotation detection pulses DP that are output in this step. More specifically, when the voltage exceeding the threshold value dVt is detected by the counter-electromotive current less than 5 times during the rotation detection (Y in step S214), the rank determining circuit 44 lowers the drive rank by one (step S215), and when the voltage exceeding the threshold value dVt is detected more than 7 times (Y in step S216), the rank determining circuit 44 raises the drive rank by one (step S211). As the driving force decreases, the number of times that the voltage exceeding the threshold value dVt is detected increases. These processes prevent the driving force from becoming excessive or too small, which serves to reduce the power consumption. It is also possible to reduce the possibility that abnormal rotation occurs due to sudden voltage fluctuations, for example. Although not shown, similarly to the first embodiment, the operation of the next step starts after the step S216 and when a predetermined time has elapsed from the start of output of the measurement drive pulse G.

Figure 19:
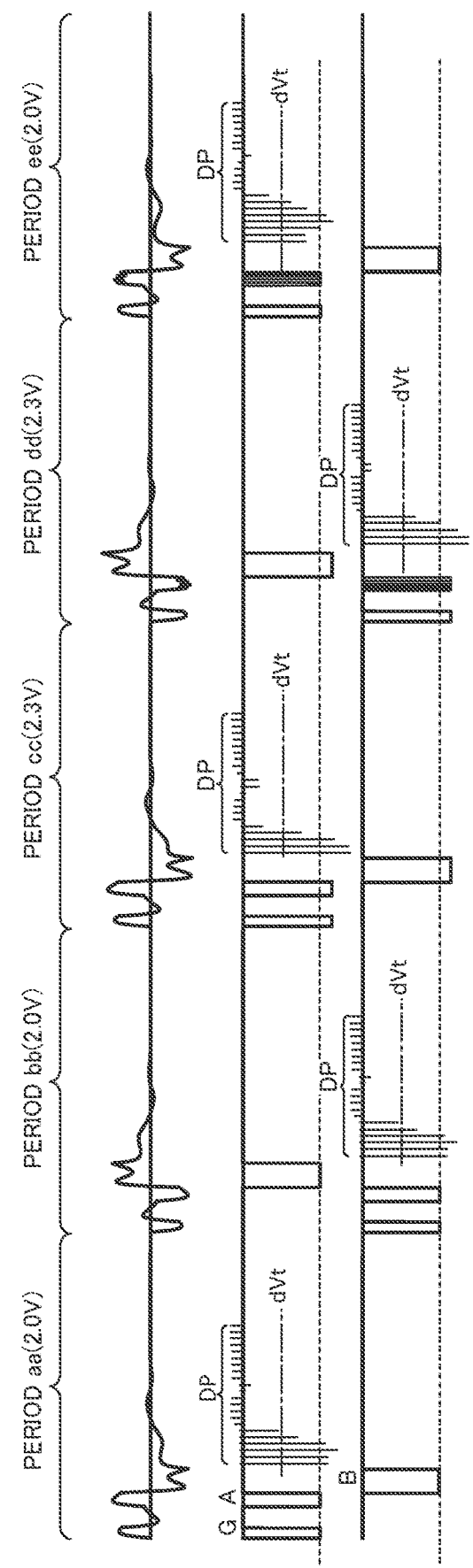
FIG. 19 is a waveform diagram showing an example of an operation with a change in a drive rank in accordance with voltage variations of a battery.

FIG. 19 is a waveform diagram showing an example of an operation with a change in the drive rank in accordance with voltage variations of the chargeable and dischargeable battery, such as a lithium battery. In FIG. 19, the waveform of the counter-electromotive current and the waveform of the signal applied to the terminals O1 and O2 of the coil 21 are described. The periods aa, bb, cc, dd, and ee show the wave forms for the operation of the steps in which the rotor 22 is half-rotated, respectively. In the period aa, the power supply voltage is 2.0V and the drive rank is 2. The period aa corresponds to the example of FIG. 7. In the period aa, the number of times the voltage equal to or more than the threshold value dVt is detected by the rotation detection pulse DP (hereinafter referred to as the number of detections) is five, and thus the drive rank is not changed. The period bb is a period for performing half rotation of the next step, and the measurement drive pulse G, the drive pulse SP (pulses A, B), and the polarities of the measurement drive signal and the drive signal based on them are opposite to the period aa. Subsequently, the polarity is reversed each time the period of the next step is reached. The power supply voltage and the number of detections are the same as the period aa, and the drive rank is not changed.

In the period cc, the power supply voltage rises to 2.3V, and the number of detections decreases to four. The drive method switching circuit 43 lowers the drive rank to 1 accordingly. In the period dd, the power supply voltage remains 2.3V, and the partial drive signal corresponding to the pulse A is changed to a continuous pulse having a duty cycle due to the decrease in the drive rank. The driving force of the rotor 22 is reduced accordingly, and the number of detections is five and the drive rank is not changed. In the period ee, the power supply voltage drops to 2.0V, and the number of detections is seven. With this, the drive rank returns to 2. As shown in FIG. 19, the drive rank is changed in response to the change in the driving force according to the change in the power supply voltage, whereby it is possible to suppress using a drive signal of more strength than necessary and outputting the correction drive signal caused by the weaker drive signal than necessary. This serves to reduce the power consumption.

In the example of FIG. 16, the number of times the voltage exceeding dVt is detected is in a range from five to seven, the drive rank is not changed, although the rank determining circuit 44 may lower the drive rank by one in a case where the reverse rotation is normally performed in a predetermined number of steps (e.g., 200) of the reverse rotation. If the rotation is stable in a certain driving rank, there is a high possibility that the rotor can rotate without problems in a lower driving rank. As such, it is highly likely that the power consumption can be further reduced. Further, if the driving force of the rotor 22 is insufficient, the occurrence of the problem can be prevented by the output of the correction pulse FP and the increased driving rank. The power supply voltage detection circuit may be prepared in advance, and the rank determining circuit 44 may switch the drive rank based on the battery voltage.

It should be noted that the configuration diagrams, circuit diagrams, waveforms shown in the embodiments of the present invention are not limited to those described above, and can be changed as appropriate as long as the gist of the present invention is satisfied.

The invention claimed is:

1. A step motor driving device comprising:
a step motor that includes a rotor that is magnetized by two or more poles, a stator that transmits a magnetic force to the rotor and a coil that generates a magnetic force toward the stator;
a drive circuit that outputs a measurement drive signal to the coil;
a phase detecting circuit that detects a counter-electromotive current that occurs in the coil after the output of the measurement drive signal, and determines whether a phase of the rotor is a first phase based on the detected counter-electromotive current; and
a control unit that controls the step motor by a first driving method, in which the drive circuit outputs a first drive signal for rotating the rotor by one step, when the phase of the rotor is the first phase, and controls the step motor by a second driving method different from the first driving method so as to restrict the rotation of the rotor when the phase is not the first phase of the rotor.

2. The step motor driving device according to claim 1, wherein
when the phase of the rotor is the first phase, the control unit controls the step motor by the first driving method in which the drive circuit outputs the first drive signal for rotating the rotor one step backward.

3. The step motor driving device according to claim 1, wherein
in the first driving method, the drive circuit outputs the first drive signal including a first partial signal and a second partial signal, the first partial signal generating a magnetic force of a first polarity in the coil, the second partial signal generating a magnetic force of a second polarity opposite to the first polarity in the coil after the first partial signal.

4. The step motor driving device according to claim 3, wherein
in the second driving method, the drive circuit outputs a second drive signal including a first partial signal, a second partial signal, and a third partial signal, the first partial signal generating a magnetic force of the first polarity in the coil, the second partial signal generating a magnetic force of the second polarity in the coil after the first partial signal, the third partial signal generating a magnetic force of the first polarity in the coil after the second partial signal.

5. The step motor driving device according to claim 3, wherein
the drive circuit does not output a drive signal in the second driving method.

6. The step motor driving device according to claim 3, wherein
in the first driving method, the drive circuit outputs the second partial signal without outputting the first partial signal.

7. The step motor driving device according to claim 3, wherein
the control unit further includes a rank determining unit that detects a counter-electromotive current generated in the coil after the output of the first drive signal, determines a rotational force of the rotor based on the detected counter-electromotive current, and changes a rank indicating a strength of the first drive signal that is output by the drive circuit based on the determined rotational force.

8. The step motor driving device according to claim 7, wherein when the rank is a predetermined rank, the drive circuit outputs a signal for generating a magnetic force of the first polarity in the coil as the measurement drive signal, and outputs the second partial signal as the first drive signal, and when the rank corresponds to a signal stronger than the predetermined rank, the drive circuit outputs the first partial signal and the second partial signal as the first drive signal.

9. The step motor driving device according to claim 7, wherein the rank determining unit changes the rank based on whether a period in which a signal exceeding a threshold value is detected after the first drive signal is output is shorter than a predetermined period, and the rank determining unit changes the rank to a rank corresponding to a weaker signal when, in a period between the output of the first drive signal and the detection of the counter-electromotive current exceeding the threshold value, a counter-electromotive current having a polarity different from that of the counter-electromotive current exceeding the threshold value is detected.

10. The step motor driving device according to claim 7, wherein the rank determining unit detects a counter-electromotive current generated in the coil after the output of the first drive signal, and determines whether the rotor has made a predetermined rotation based on the detected counter-electromotive current, and when it is determined that the rotor has not made the predetermined rotation, the drive circuit outputs a correction drive signal for rotating the rotor stronger than the first drive signal.

11. The step motor driving device according to claim 1, wherein after the measurement drive signal, the drive circuit connects a circuit for detecting a counter-electromotive current with the coil by a phase detection pulse including a plurality of intermittent first partial pulses, and after the first drive signal is output, connects the circuit for detecting a counter-electromotive current with the coil by a rotation detection signal including a plurality of intermittent second partial pulses, and an output interval of the first partial pulses is smaller than the second partial pulses, or a period of applying each of the first partial pulse is longer than the second partial pulses.

12. The step motor driving device according to claim 1 further comprising a normal pulse generating circuit configured to generate and output a drive pulse.

\* \* \* \* \*